(12) United States Patent
Haski et al.

(10) Patent No.: US 10,129,705 B1
(45) Date of Patent: Nov. 13, 2018

(54) LOCATION PREDICTION USING WIRELESS SIGNALS ON ONLINE SOCIAL NETWORKS

(71) Applicant: Facebook, Inc., Menlo Park, CA (US)

(72) Inventors: Jonathan Haski, New York, NY (US); Aileen Chen, Washington, DC (US); Aaron Bryan Adcock, New York, NY (US); Yaniv Shmueli, Millburn, NJ (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/838,289

(22) Filed: Dec. 11, 2017

(51) Int. Cl.
*H04W 24/00* (2009.01)
*H04W 4/029* (2018.01)
*H04W 4/21* (2018.01)

(52) U.S. Cl.
CPC ............. *H04W 4/029* (2018.02); *H04W 4/21* (2018.02)

(58) Field of Classification Search
CPC ....... H04W 12/08; H04W 24/02; H04W 4/02; H04W 12/12; H04W 4/025; H04W 64/00; H04W 8/245
USPC ........... 455/405, 418, 411, 456.1, 557, 456.6
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,565,157 B1 | 6/2009 | Ortega | |
| 7,714,778 B2 | 5/2010 | Dupray | |
| 7,752,326 B2 | 7/2010 | Smit | |
| 7,783,630 B1 | 8/2010 | Chevalier | |
| 7,797,635 B1 | 9/2010 | Denise | |
| 7,836,044 B2 | 11/2010 | Kamvar | |
| 7,840,589 B1 | 11/2010 | Holt | |
| 7,890,131 B2* | 2/2011 | Backes | H04L 47/125 455/522 |
| 7,903,029 B2 | 3/2011 | Dupray | |
| 8,024,328 B2 | 9/2011 | Dolin | |

(Continued)

OTHER PUBLICATIONS

U.S. Appl. No. 15/838,287, filed Dec. 11, 2017, Ott.

(Continued)

*Primary Examiner* — Joseph Arevalo
(74) *Attorney, Agent, or Firm* — Baker Botts L.L.P.

(57) ABSTRACT

In one embodiment, a method includes receiving, from a first software application of a client system associated with a user of an online social network, background signal-information identifying one or more first wireless signals; storing the signal-information and a client identifier for the client system in a signal-information database; receiving, from a second software application of the client system via a places-API of the online social network, a places-API call indicating that the client system is located at a geographic location corresponding to a first place-entity; recording the places-API call in an API-call log, wherein the API-call log records the first place-entity and the client identifier; determining a correlation between the signal-information and the first place-entity; and updating a place-entity database to indicate that the first place-entity corresponds to the one or more first wireless signals identified by the signal-information.

20 Claims, 13 Drawing Sheets

(56) References Cited

U.S. PATENT DOCUMENTS

| | | |
|---|---|---|
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,413 B2 | 3/2012 | Dupray |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,661 B1 | 8/2012 | Komissarchik |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,015,733 B2 | 4/2015 | Schrock |
| 9,183,504 B2 | 11/2015 | Moore |
| 9,223,899 B2 | 12/2015 | Singh |
| 9,342,605 B2 | 5/2016 | Richter |
| 9,400,822 B2 | 7/2016 | Schrock |
| 9,576,060 B2 | 2/2017 | Singh |
| 9,602,965 B1 | 3/2017 | Kalis |
| 9,646,028 B2 | 5/2017 | Schrock |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0152485 A1* | 8/2004 | Deeds ............... H04N 1/00127 455/556.1 |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0045234 A1* | 2/2008 | Reed .................... H04W 8/02 455/456.1 |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0161215 A1 | 6/2010 | Karani |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0279708 A1 | 11/2010 | Lidsrom |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184945 A1 | 7/2011 | Das |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0058775 A1 | 3/2012 | Dupray |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0196571 A1* | 8/2012 | Grkov .................. H04L 63/14 455/411 |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |

(56) References Cited

U.S. PATENT DOCUMENTS

| | | |
|---|---|---|
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0103697 A1 | 4/2013 | Hill |
| 2013/0124538 A1 | 5/2013 | Lee |
| 2013/0124542 A1 | 5/2013 | Lee |
| 2013/0144899 A1 | 6/2013 | Lee |
| 2013/0166526 A1 | 6/2013 | Moxley |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2013/0285855 A1 | 10/2013 | Dupray |
| 2014/0006416 A1 | 1/2014 | Leslie |
| 2014/0067535 A1 | 3/2014 | Rezaei |
| 2014/0122465 A1 | 5/2014 | Bilinski |
| 2014/0155084 A1* | 6/2014 | Pon ........................ G01S 5/0236 455/456.1 |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0066189 A1* | 3/2016 | Mahaffey ................ G06F 21/88 455/405 |
| 2016/0162502 A1 | 6/2016 | Zhou |
| 2016/0203238 A1 | 7/2016 | Cherniavskii |
| 2017/0046390 A1 | 2/2017 | Jain |
| 2017/0083523 A1 | 3/2017 | Philip |
| 2017/0103110 A1 | 4/2017 | Winstanley |
| 2017/0132226 A1 | 5/2017 | Kalis |
| 2017/0134508 A1 | 5/2017 | Kalis |
| 2017/0139920 A1 | 5/2017 | Ball |
| 2017/0147696 A1 | 5/2017 | Evnine |
| 2017/0156033 A1 | 6/2017 | Kalis |
| 2017/0185603 A1 | 6/2017 | Dentel |
| 2017/0199905 A1 | 7/2017 | Ott |
| 2017/0199927 A1 | 7/2017 | Moore |
| 2017/0201851 A1 | 7/2017 | Huang |
| 2017/0206250 A1 | 7/2017 | Loomans |
| 2017/0206271 A1 | 7/2017 | Jain |
| 2017/0308583 A1 | 10/2017 | Husain |

OTHER PUBLICATIONS

U.S. Appl. No. 15/838,292, filed Dec. 11, 2017, Gandhi.

Noulas et al., *Mining User Mobility Features for Next Place Prediction in Location-based Services* (2012), available at https://www.cl.cam.ac.uk/~cm542/papers/icdm2012.pdf.

Mathew et al., *Predicting Future Locations with Hidden Markov Models* (2012), available at http://lbsn2012.cmuchimps.org/papers/Paper16_Mathew.pdf.

Tran et al., *Next Place Prediction using Mobile Data* (2012), available at https://www.usna.edu/Users/cs/lmcdowel/pubs/mdc-final156-tran.pdf.

Laurila et al., *The Mobile Data Challenge: Big Data for Mobile Computing Research* (Jan. 2012), available at https://pdfs.semanticscholar.org/8dae/ecc84fcaf42172cba7ef58e5068fae7bbcbc.pdf.

Feng et al., *Personalized Ranking Metric Embedding for Next New POI Recommendation* (2015), available at http://ijcai.org/Proceedings/15/Papers/293.pdf.

Liu et al., *Predicting the Next Location: A Recurrent Model with Spatial and Temporal Contexts* (2016), available at http://www.nlpr.ia.ac.cn/english/irds/People/lwang/M-MCG_EN/Publications/2016/QL2016AAAI.pdf.

Du et al., *Recurrent Marked Temporal Point Processes: Embedding Event History to Vector* (Aug. 2016), available at http://www.cc.gatech.edu/~lsong/papers/DuDaiTriEtal16.pdf.

Zhu, et al.; *Learning from Labeled and Unlabeled Data with Label Propagation*, 2002.

Avery Ching; *Giraph: Production-grade graph processing infrastructure for trillion edge graphs*, Jun. 22, 2014.

Maja Kabiljo; *Recommending items to more than a billion people*, https://code.facebook.com/posts/861999383875667/recommending-items-to-more-than-a-billion-people/, Jun. 2, 2015.

* cited by examiner

| First evaluation place-entity | Ordered list of predicted second place-entities | Evaluation pair | Rank | Reciprocal rank |
|---|---|---|---|---|
| A | {C, B, R} | (A, R) | 3 | 1/3 |
| B | {R, S, C} | (B, R) | 1 | 1 |
| C | {A, B, R} | (C, B) | 2 | 1/2 |

LOCATION PREDICTION USING WIRELESS SIGNALS ON ONLINE SOCIAL NETWORKS

TECHNICAL FIELD

This disclosure generally relates to online social networks, places, and geo-location.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the social-networking system 1160 may predict a second geographic location that a user will visit subsequent to the user's presence at a first geographic location. In other words, the social-networking system 1160 may predict the next place the user will visit given information about a previous place the user has visited or will visit. In particular embodiments, a technical problem arising in the field of geo-location may be providing users with information associated with a geographic location they will visit in the future based on a current geolocation. The technical solutions described herein of automatically predicting a second geographic location that a user will visit subsequent to the user's presence at a first geographic location and sending the user information associated with the second geographic location may improve computing processes related to receiving and executing queries by reducing the need for the user to send queries related to the second geographic location, which may reduce the computing resources needed for such processes. In particular embodiments, the social-networking system 1160 may calculate the probability $P(k|X)$ that a user will visit a second geographic location k subsequent to the user's presence at a given a first geographic location X. The social-networking system 1160 may use a model trained by machine learning, which may take an input embedding representing a first place-entity corresponding to a first geographic location and output a predicted second place-entity corresponding to a second geographic location that the user will subsequently visit. In particular embodiments, the prediction may be a most probable second geographic location that the user will subsequently visit, a confidence score representing the confidence that the user will subsequently visit a particular second geographic location, or it may be a ranked list of probable second geographic locations that the user will subsequently visit. In particular embodiments, features of a place-entity may be selected by feature extraction to generate an embedding representing a place-entity. The features extracted may include the category of the place-entity (e.g., bar, gym), the time of the user's visit to the geographic location corresponding to the place-entity (e.g., time of day, day of week), the hours that the geographic location corresponding to the place-entity is open, popular hours of a geographic location corresponding to the place-entity, or any other suitable features related to the place-entity. User attributes may also be used to generate an embedding (e.g., an embedding of a place-entity may be reconstructed from embeddings of the users visiting the geographic location corresponding to the place-entity). In particular embodiments, training data used to train a machine-learning model may be from users of an online social network or any other suitable data. To train a machine-learning model, positive and negative pairs of first geographic locations and second geographic locations may be used. In particular embodiments, a machine-learning model used to generate place-entity embeddings may be evaluated. As an example and not by way of limitation, for an evaluation set, the mean-reciprocal rank (MRR) may be used to evaluate the machine-learning model. In particular embodiments, a machine-learning model may be used to make a prediction about which second geographic location a user will visit to subsequent to a given current first geographic location of the user. In particular embodiments, a prediction may be used to suggest a second geographic location a user should visit next. In particular embodiments, a prediction may be used to deliver content associated with the predicted second geographic location to the client system 1130 of the user. In particular embodiments, a prediction may be used to predict a user's current second geographic location based on a first geographic location previously visited by the user. As an example and not by way of limitation, a user's current location may be unknown or unable to be precisely determined. The social-networking system 1160 may use a previous first geographic location visited by the user to predict a user's current second geographic location. In particular embodiments, the prediction may be used as one of many factors in predicting the user's current geographic location. As an example and not by way of limitation, the predicted current second geographic location may be based on the output of a machine-learning model as well as GPS data, wireless signal-information received by the client system 1130 of the user, or any other suitable information. Although this disclosure describes predicting a second geographic location or place-entity based on a first geographic location or first place-entity in a particular manner, this disclosure contemplates predicting a second geographic location or place-entity based on a first geographic location or first place-entity in any suitable manner. Furthermore, although this disclosure describes or illustrates particular embodiments as providing particular advantages, particular embodiments may provide none, some, or all of these advantages.

In particular embodiments, the social-networking system 1160 may determine the most likely geographic location a user is located based on background signal-information from a first software application of a client system 1130 of the user and a places-API call from a second software application of the client system 1130. In particular embodiments, a technical problem arising in the field of geo-location may be to disambiguate the geographic location of a user. In particular embodiments, using background signal-information, as described in this disclosure, may be used as an alternative to or in conjunction with other location data (e.g., GPS), which may provide the advantage of more accurately or precisely determining a geographic location of a user. As an example and not by way of limitation, a user may be located at "The Old Pro." A first software application may collect and send to the social-networking system 1160 background signal-information associated with the geographic location (e.g., Wi-Fi signals at that location). The signal-information and a first client identifier of the client system 1130 may be stored in a signal-information database. The first client identifier may be hashed. The user may check-in to "The Old Pro" using a second software application. The second software application may check-in by using a places-API call of an online social network of the social-networking system 1160 to access information associated with a place-entity corresponding to the geographic location "The Old Pro." The place-entity and first client identifier may be recorded in an API-call log. The first client identifier may be hashed. The social-networking system 1160 may determine a correlation between the signal-information and the place-entity corresponding to "The Old Pro" based on matching the hash of the first client identifier in the signal-information log and the hash of the first client identifier in the API-call log. The social-networking system 1160 may update a place-entity database to indicate that the place-entity corresponding to "The Old Pro" corresponds to the background signal-information. A second client system 1130 of a second user may send background signal-information. The social-networking system 1160 may determine that the second client system 1130 is located at "The Old Pro" based on determining that the background signal-information from the second client system 1130 matches the background signal-information from the first client system 1130. Although this disclosure describes determining a most likely geographic location of a user or a client system 1130 in a particular manner, this disclosure contemplates determining a most likely geographic location of a user or a client system 1130 in any suitable manner. Furthermore, although this disclosure describes or illustrates particular embodiments as providing particular advantages, particular embodiments may provide none, some, or all of these advantages.

In particular embodiments, the social-networking system 1160 may identify place-entities corresponding to invalid geographic locations based on information associated with place-entity nodes each corresponding to the geographic location. In particular embodiments, information associated with a place-entity in a place-entities graph may be from a source such as user-created pages, pages from the internet, WIKIPEDIA, from users via the Open Graph protocol, or any other suitable source. In particular embodiments, a technical problem arising in the field of place-entities graphs may be providing users with information associated with valid place-entities. Because information about place-entities may originate from many sources, some of which have higher quality information than others, information about place-entities may include low-quality or invalid information. In particular embodiments, low-quality or invalid place-entities may be automatically detected and filtered (e.g., place-entities corresponding to a geographic location that does not exist, duplicate place-entities, non-public or user-specific places, etc.). The technical solutions described herein of automatically detecting and filtering invalid place-entities may improve computing processes related to storing and searching for place-entities, which may reduce the computing resources needed for such processes while still providing high quality information to users in an automatic manner. Furthermore, the technical solutions described herein may reduce or eliminate the need to manually review place-entities to determine whether the place-entities are valid and may reduce the data throughput required to respond to a query by filtering out invalid place-entity results. In particular embodiments, a place-entity cluster may comprise a plurality of place-entity nodes corresponding to a plurality of respective place-entities, each place-entity corresponding to the same geographic location. In particular embodiments, using information from multiple place-entity nodes in a place-entity cluster may provide information that indicates whether the place-entity nodes correspond to an invalid geographic location. A cluster-quality score may be calculated for a place-entity cluster based on a plurality of embeddings representing a plurality of respective place-entities of the place-entity cluster. In particular embodiments, place-entity nodes of a place-entity cluster may be flagged as being of high quality, and may be used in a "premium" or "verified" place-entity graph based on determining that the cluster-quality score is above a threshold score. In particular embodiments, place-entity nodes of a place-entity cluster associated with a cluster-quality score below a threshold score may be reclassified as a non-place-entity node, suppressed or filtered during a search, or ranked lower in a search. Although this disclosure describes determining whether a place-entity corresponds to a valid or invalid geographic location in a particular manner, this disclosure contemplates determining whether a place-entity corresponds to a valid or invalid geographic location in any suitable manner. Furthermore, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates an example calculation of an example evaluation metric.

DESCRIPTION OF EXAMPLE EMBODIMENTS

Artificial Neural Networks

Figure 1:
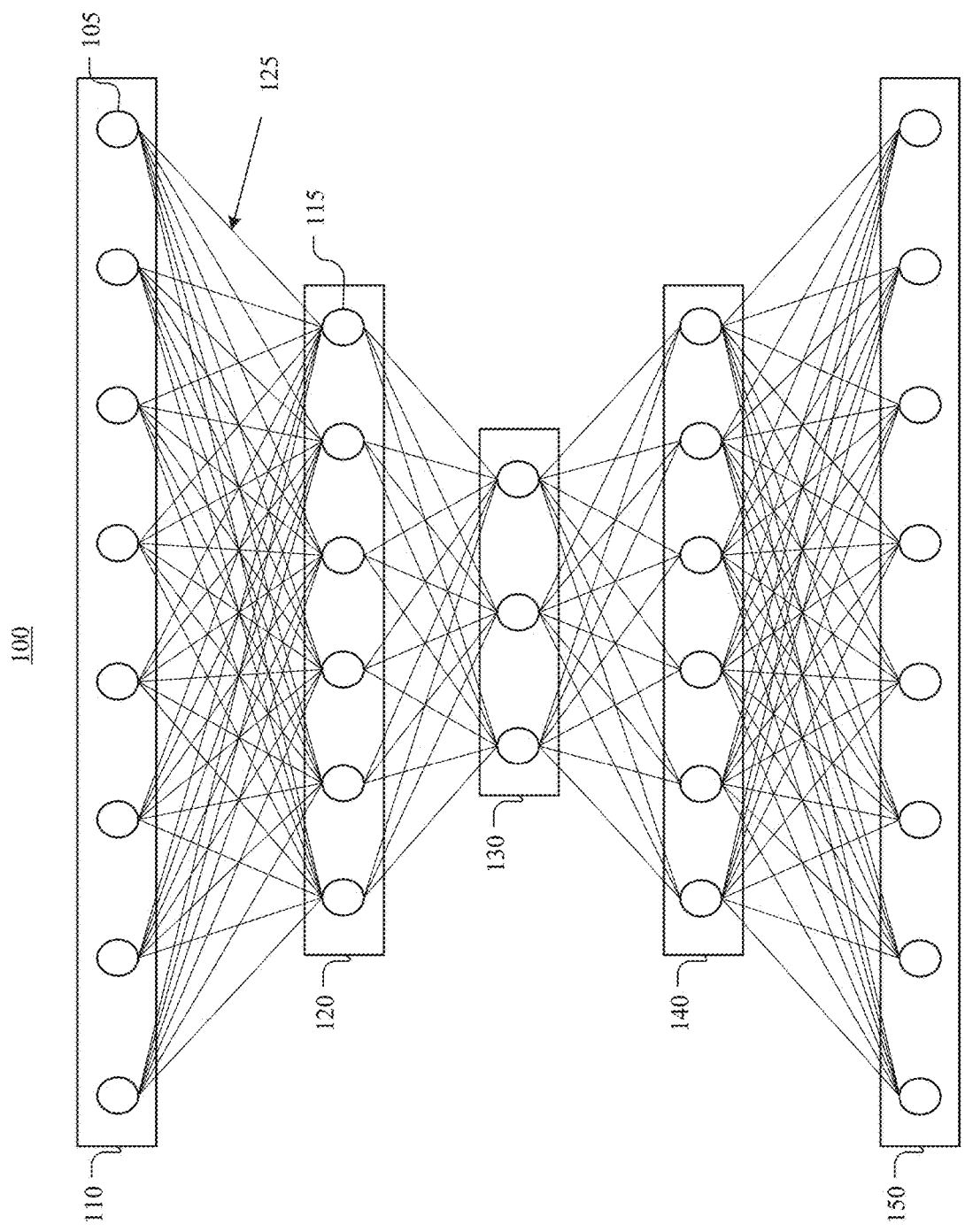
FIG. 1 illustrates an example artificial neural network.

FIG. 1 illustrates an example artificial neural network ("ANN") 100. In particular embodiments, an ANN may refer to a computational model comprising one or more nodes. Example ANN 100 may comprise an input layer 110, hidden layers 120, 130, 140, and an output layer 150. Each layer of the ANN 100 may comprise one or more nodes, such as a node 105 or a node 115. In particular embodiments, each node of an ANN may be connected to another node of the ANN. As an example and not by way of limitation, each node of the input layer 110 may be connected to one of more nodes of the hidden layer 120. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 1 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 1 depicts a connection between each node of the input layer 110 and each node of the hidden layer 120, one or more nodes of the input layer 110 may not be connected to one or more nodes of the hidden layer 120.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 120 may comprise the output of one or more nodes of the input layer 110. As another example and not by way of limitation, the input to each node of the output layer 150 may comprise the output of one or more nodes of the hidden layer 140. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be $F(x)+x$, where $F(x)$ may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0,s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 125 between the node 105 and the node 115 may have a weighting coefficient of 0.4, which may indicate that 0.4 multiplied by the output of the node 105 is used as an input to the node 115. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. A vector representing an object may also be referred to as an embedding representing the object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 100 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Vector Spaces and Embeddings

Figure 2:
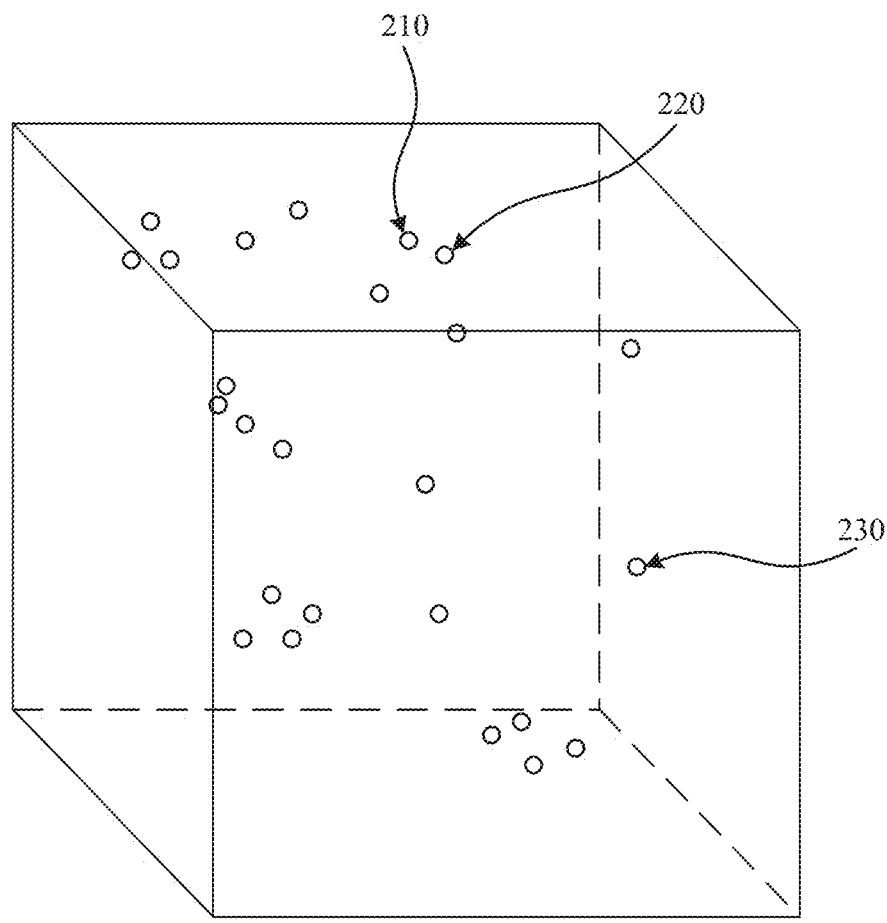
FIG. 2 illustrates an example view of a vector space.

FIG. 2 illustrates an example view of a vector space 200. The vector space 200 may also be referred to as a feature space or an embedding space. In particular embodiments, an object or an n-gram may be represented in a d-dimensional vector space, where d denotes any suitable number of dimensions. Although the vector space 200 is illustrated as a three-dimensional space, this is for illustrative purposes only, as the vector space 200 may be of any suitable dimension. Each vector may comprise coordinates corresponding to a particular point in the vector space 200 (i.e., the terminal point of the vector). As an example and not by way of limitation, vectors 210, 220, and 230 may be represented as points in the vector space 200, as illustrated in FIG. 2. In particular embodiments, a mapping from data to a vector may be relatively insensitive to small changes in the data (e.g., a small change in the data being mapped to a vector will still result in approximately the same mapped vector). In particular embodiments, social-networking system 1160 may map objects of different modalities to the same vector space or use a function jointly trained to map one or more modalities to a feature vector (e.g., between visual, audio, text). Although this disclosure may describe a particular vector space, this disclosure contemplates any suitable vector space.

In particular embodiments, an n-gram may be mapped to a respective vector representation, which may be referred to as a term vector or a term embedding. As an example and not by way of limitation, n-grams $t_1$ and $t_2$ may be mapped to vectors $\vec{v_1}$ and $\vec{v_2}$ in the vector space 200, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 200. In particular embodiments, an n-gram may be mapped to a vector representation in the vector space 200 by using a machine leaning model (e.g., a neural network). The machine-learning model may have been trained using training data (e.g., a corpus of objects each comprising n-grams). In particular embodiments, the machine-learning model may be trained using an objective function or a loss function (e.g., a function that is to be maximized or minimized over training data). As an example and not by way of limitation, a machine-learning model may be trained to predict an n-gram in a sentence given other n-grams in the sentence (e.g., a continuous bag-of-words model). As another example and not by way of limitation, a machine-learning model may be trained to predict other n-grams in a sentence given an n-gram in the sentence (e.g., a skip-gram model). Although this disclosure describes representing an n-gram in a vector space in a particular manner, this disclosure contemplates representing an n-gram in a vector space in any suitable manner.

In particular embodiments, an object may be represented in the vector space 200 as a vector, which may be referred to as a feature vector or an object embedding. As an example and not by way of limitation, objects $e_1$ and $e_2$ may be mapped to vectors $\vec{v_1}$ and $\vec{v_2}$ in the vector space 200, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. In particular embodiments, an object may be mapped to a vector by using a machine-learning model. In particular embodiments, the machine-learning model may be trained using an objective function or a loss function. Although this disclosure describes representing an object in a vector space in a particular manner, this disclosure contemplates representing an object in a vector space in any suitable manner.

In particular embodiments, the social-networking system 1160 may calculate a similarity metric of vectors in vector space 200. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 200. As an example and not by way of limitation, vector 210 and vector 220 may correspond to objects that are more similar to one another than the objects corresponding to vector 210 and vector 230, based on the distance between the respective vectors. In particular embodiments, social-networking system 1160 may determine a cluster of vector space 200. A cluster may be a set of one or more points corresponding to feature vectors of objects or n-grams in vector space 200, and the objects or n-grams whose feature vectors are in the cluster may belong to the same class or have a relationship to one another (e.g., a semantic relationship, a visual relationship, a topical relationship, etc.). As an example and not by way of limitation, cluster 240 may correspond to sports-related content and another cluster may correspond to food-related content. Although this disclosure describes calculating a similarity metric between vectors and determining a cluster in a particular manner, this disclosure contemplates calculating a similarity metric between vectors or determining a cluster in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Location Information

In particular embodiments, the social-networking system 1160 may determine a geographic location (hereinafter also "location") associated with an entity (e.g., a user, a concept, a place-entity, or a client system 1130 associated with a user or concept). The location of an object may be identified and stored as a street address (e.g., "1601 Willow Road, Menlo Park, Calif."), a set of geographic coordinates (e.g., latitude and longitude), a reference to another location or object (e.g., "the coffee shop next to the train station"), a reference to a map tile (e.g., "map tile 32"), or using another suitable identifier. In particular embodiments, the location of an object may be provided by a user of an online social network. As an example and not by way of limitation, a user may input his location by checking-in at the location or otherwise providing an indication of his location. As another example and not by way of limitation, a user may input the location of a concept (e.g., a place or venue) by accessing the profile page for the concept and entering the location information (e.g., the stress address) of the concept.

In particular embodiment, the location of a client system 1130 equipped with cellular, Wi-Fi, Global Positioning System (GPS), or other suitable capabilities may be identified with geographic-positioning signals. As an example and not by way of limitation, a mobile-client system 1130 may include one or more sensors that may facilitate geo-location functionalities of the system. Processing of sensor inputs by the mobile-client system 1130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Geographic-positioning signals may be obtained by cell tower triangulation, Wi-Fi positioning, or GPS positioning. In particular embodiments, a geographic location of an Internet-connected computer can be identified by the computer's IP address. A mobile-client system 1130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the mobile-client system 1130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 1160 may assume that the user is still at that particular location. Although this disclosure describes determining the location of an object in a particular manner, this disclosure contemplates determining the location of an object in any suitable manner.

In particular embodiments, the social-networking system 1160 may maintain a database of information relating to locations or places. The social-networking system 1160 may also maintain meta information about particular locations or places, such as, for example, photos of a location or place, advertisements, user reviews, comments, "check-in" activity data, "like" activity data, hours of operation, or other suitable information related to the location or place. In particular embodiments, a location or place may correspond to a concept node 1204 in a social graph 1200. The social-networking system 1160 may allow users to access information regarding a location or place using a client application (e.g., a web browser or other suitable application) hosted by a client system 1130. As an example and not by way of limitation, the social-networking system 1160 may serve webpages (or other structured documents) to users that request information about a location or place. In addition to user profile and location information, the system may track or maintain other information about the user. As an example and not by way of limitation, the social-networking system 1160 may support geo-social-networking functionality including one or more location-based services that record the user's location. As an example and not by way of limitation, users may access the geo-social-networking system using a special-purpose client application hosted by a mobile-client system 1130 of the user (or a web- or network-based application using a browser client). The client application may automatically access GPS or other geo-location functions supported by the client system 1130 and report the user's current location to the geo-social-networking system. In addition, the client application may support geo-social networking functionality that allows users to "check-in" at various locations or places and communicate this location or place to other users. A check-in to a given location or place may occur when a user is physically located at a location or place and, using a client system 1130, access the geo-social-networking system to register the user's presence at the location or place. The social-networking system 1160 may automatically check-in a user to a location or place based on the user's current location and past location data. In particular embodiments, the social-networking system 1160 may allow users to indicate other types of relationships with respect to particular locations or places, such as "like," "fan," "worked at," "recommended," "attended," or another suitable type of relationship. In particular embodiments, "check-in" information and other relationship information may be represented in the social graph 1200 as an edge 1206 connecting the user node 1202 of the user to the concept node 1204 of the location or place.

Prediction of Next Place Visits

In particular embodiments, the social-networking system 1160 may predict a second geographic location that a user will visit subsequent to the user's presence at a first geographic location. In other words, the social-networking system 1160 may predict the next place the user will visit given information about a previous place the user has visited or will visit. In particular embodiments, a technical problem arising in the field of geo-location may be providing users with information associated with a geographic location they will visit in the future based on a current geolocation. The technical solutions described herein of automatically predicting a second geographic location that a user will visit subsequent to the user's presence at a first geographic location and sending the user information associated with the second geographic location may improve computing processes related to receiving and executing queries by reducing the need for the user to send queries related to the second geographic location, which may reduce the computing resources needed for such processes. In particular embodiments, the social-networking system 1160 may calculate the probability P (k |X) that a user will visit a second geographic location k subsequent to the user's presence at given a first geographic location X. The social-networking system 1160 may use a model trained by machine learning, which may take an input embedding representing a first place-entity corresponding to a first geographic location and output a predicted second place-entity corresponding to a second geographic location that the user will subsequently visit. In particular embodiments, the prediction may be a most probable second geographic location that the user will subsequently visit, a confidence score representing the confidence that the user will subsequently visit a particular second geographic location, or it may be a ranked list of probable second geographic locations that the user will subsequently visit. In particular embodiments, features of a place-entity may be selected by feature extraction to generate an embedding representing a place-entity. The features extracted may include the category of the place-entity (e.g., bar, gym), the time of the user's visit to the geographic location corresponding to the place-entity (e.g., time of day, day of week), the hours that the geographic location corresponding to the place-entity is open, popular hours of a geographic location corresponding to the place-entity, or any other suitable features related to the place-entity. User attributes may also be used to generate an embedding (e.g., an embedding of a place-entity may be reconstructed from embeddings of the users visiting the geographic location corresponding to the place-entity). In particular embodiments, training data used to train a machine-learning model may be from users of an online social network or any other suitable data. To train a machine-learning model, positive and negative pairs of first geographic locations and second geographic locations may be used. In particular embodiments, a machine-learning model used to generate place-entity embeddings may be evaluated. As an example and not by way of limitation, for an evaluation set, the mean-reciprocal rank (MRR) may be used to evaluate the machine-learning model. In particular embodiments, a machine-learning model may be used to make a prediction about which second geographic location a user will visit to subsequent to a given current first geographic location of the user. In particular embodiments, a prediction may be used to suggest a second geographic location a user should visit next. In particular embodiments, a prediction may be used to deliver content associated with the predicted second geographic location to the client system 1130 of the user. In particular embodiments, a prediction may be used to predict a user's current second geographic location based on a first geographic location previously visited by the user. As an example and not by way of limitation, a user's current location may be unknown or unable to be precisely determined. The social-networking system 1160 may use a previous first geographic location visited by the user to predict a user's current second geographic location. In particular embodiments, the prediction may be used as one of many factors in predicting the user's current geographic location. As an example and not by way of limitation, the predicted current second geographic location may be based on the output of a machine-learning model as well as GPS data, wireless signal-information received by the client system 1130 of the user, or any other suitable information. Although this disclosure describes predicting a second geographic location or place-entity based on a first geographic location or first place-entity in a particular manner, this disclosure contemplates predicting a second geographic location or place-entity based on a first geographic location or first place-entity in any suitable manner. Furthermore, although this disclosure describes or illustrates particular embodiments as providing particular advantages, particular embodiments may provide none, some, or all of these advantages.

Figure 3:
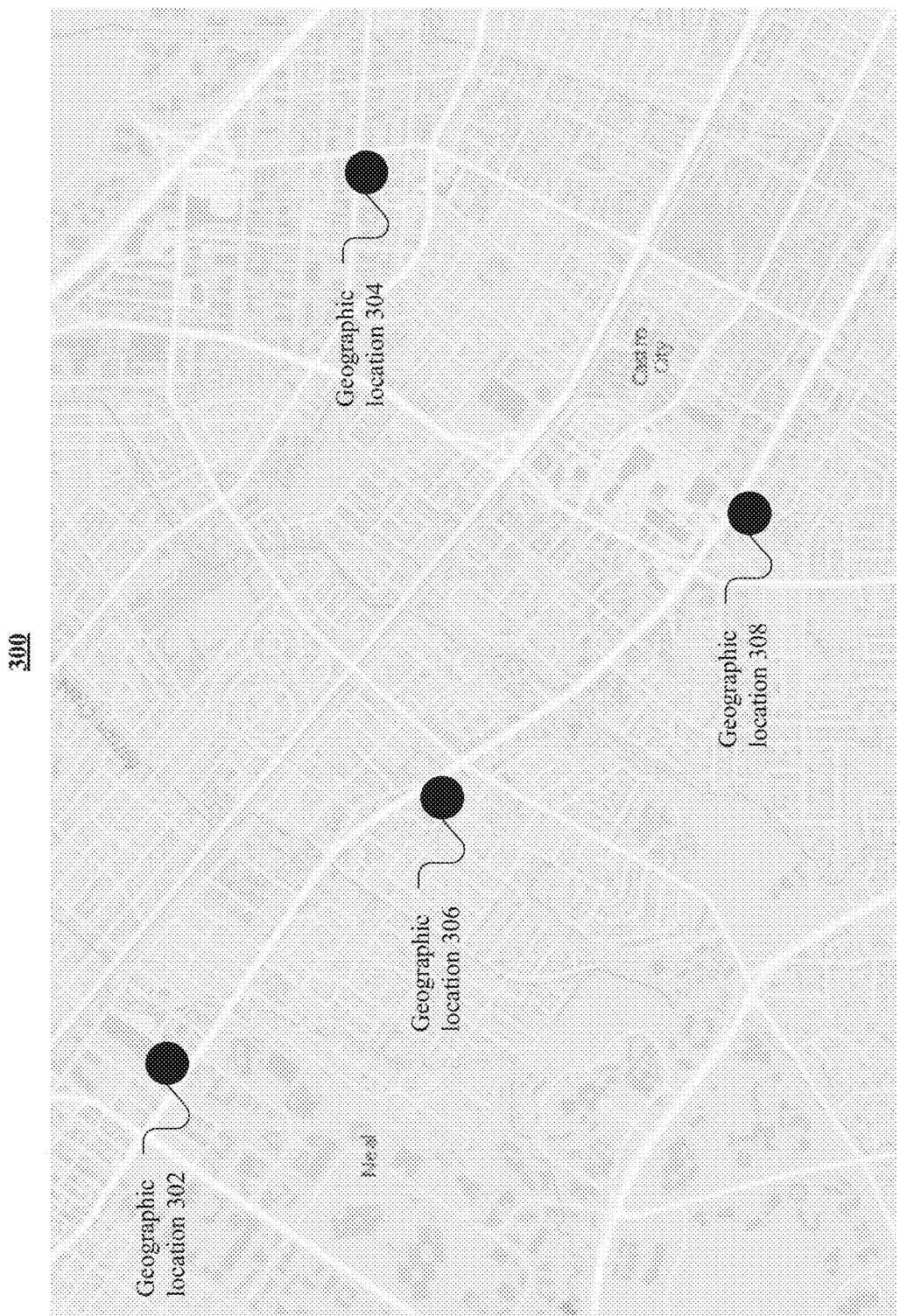
FIG. 3 illustrates example symbolic depictions of geographic locations on an example map.

FIG. 3 illustrates example symbolic depictions of geographic locations 302-308 on an example map 300. In particular embodiments, the social-networking system 1160 may receive, from a client system 1130 associated with a first user, data indicating that the first user is located at a first geographic location at a first time. A geographic location may refer to a particular physical place or location. As an example and not by way of limitation, the social-networking system 1160 may receive data indicating that a first user is located at geographic location 302. In particular embodiments, the data indicating that the user is located at a first geographic location may comprise geographic coordinates, an identification of a business at the geographic location, or any other suitable data. As an example and not by way of limitation, a client system 1130 of a user may send to the social-networking system 1160 the geographical latitude and longitude of the client system 1130, which the client system 1130 may have determined using a Global Positioning System (GPS). As another example and not by way of limitation, a user may 'check-in' to a STARBUCKS coffee house on an online social network of the social-networking system 1160 and the check-in may comprise a unique ID associated with the STARBUCKS that may be used to determine the geographic location of the STARBUCKS. Although this disclosure describes receiving data indicating that a user is located at a geographic location in a particular manner, this disclosure contemplates receiving data indicating that a user is located at a geographic location in any suitable manner. Furthermore, although this disclosure describes particular data indicating a geographic location of a user, this disclosure contemplates any suitable data indicating a geographic location of a user.

In particular embodiments, a machine-learning model may be trained to generate an embedding representing a place-entity. A place-entity may correspond to a particular geographic location. As an example and not by way of limitation, a place-entity may correspond to a concept node representing a particular geographic location. As another example and not by way of limitation, a place-entity may comprise data or a reference to data associated with a particular geographic location. In particular embodiments, the machine-learning model may be trained by accessing a plurality of positive training pairs of training place-entities, accessing a plurality of negative training pairs of training place-entities, and optimizing an objective function based on the plurality of positive training pairs and the plurality of negative training pairs. Although this disclosure describes training a machine-learning model in a particular manner, this disclosure contemplates training a machine-learning model in any suitable manner.

In particular embodiments, the social-networking system 1160 may access a plurality of positive training pairs of training place-entities. Each positive training pair may comprise a first training place-entity corresponding to a first training geographic location that a second user was located at and a second training place-entity corresponding to a second training geographic location that the second user was located at within the particular timeframe of the second user being located at the first training geographic location. As an example and not by way of limitation, a particular timeframe may be a twenty-four hour timeframe. A second user may visit a WALGREENS pharmacy at a geographic location corresponding to place-entity A then visit a BURGER KING restaurant at a geographic location corresponding to place-entity B an hour later. The pair of place-entities (A, B) may be a positive training pair of place-entities. Although this disclosure describes particular positive training pairs of place-entities, this disclosure contemplates any suitable positive training pair of place-entities.

In particular embodiments, the social-networking system 1160 may access a plurality of negative training pairs of training place-entities. Each negative training pair may comprise a first training place-entity corresponding to a first training geographic location that a second user was located at and a second training place-entity corresponding to a second training geographic location that the second user was not located within the particular timeframe of the second user being located at the first training geographic location. As an example and not by way of limitation, a particular timeframe may be a twelve-hour timeframe. A second user may visit a WALGREENS pharmacy at a geographic location corresponding to place-entity A. The second user may have not been located at a MCDONALD'S restaurant at a geographic location corresponding to place-entity C within the twelve-hour timeframe from the user's visit to the WALGREENS pharmacy. The pair of place-entities (A, C) may be a negative training pair of place-entities. In particular embodiments, for each negative training pair, the second training geographic location may be within a predetermined geographic distance of the first training geographic location. As an example and not by way of limitation, the predetermined geographic distance may be 25 miles, and the geographic distance between the first training geographic location and second training geographic location corresponding to each negative training pair may be less than or equal to 25 miles. Although this disclosure describes particular negative training pairs of place-entities, this disclosure contemplates any suitable negative training pair of place-entities.

In particular embodiments, the social-networking system 1160 may train the machine-learning model to generate an embedding representing a first place-entity and an embedding representing a predicted second place-entity by optimizing an objective function based on the plurality of positive training pairs and the plurality of negative training pairs. As an example and not by way of limitation, the machine-learning model may be an artificial neural network ("ANN"). The social-networking system 1160 may train the ANN by backpropagating the sum-of-squares error based on the observed statistical frequency between the positive training pairs and negative training pairs. In particular embodiments, the objective function may comprise a cosine similarity between an embedding representing a first training place-entity and an embedding representing a second training place-entity. A cosine similarity between an embedding representing a first place-entity and an embedding representing a second place-entity may represent or correspond to a probability or statistical likelihood that a user was located at the second geographic location corresponding to the second place-entity within the particular timeframe of the user being located at a first geographic location corresponding to the first place-entity. Although this disclosure describes training a particular machine-learning model in a particular manner, this disclosure contemplates training any suitable machine-learning model in any suitable manner.

FIG. 4 illustrates an example calculation of an example evaluation metric. An evaluation metric may be a statistical measure for evaluating how well a machine-learning model performs. As an example and not by way of limitation, an evaluation metric may be a mean-reciprocal rank, a mean-average precision, or any other suitable metric. In particular embodiments, a machine-learning model may be evaluated by accessing a plurality of evaluation pairs of evaluation place-entities, generating, for each first evaluation place-entity, an ordered list of predicted second place entities, and calculating, for each first evaluation place-entity, a mean-reciprocal rank based on the second evaluation place-entity and the ordered list of predicted second place entities. In particular embodiments, the social-networking system 1160 may access a plurality of evaluation pairs of evaluation place-entities. Each evaluation pair may comprise a first evaluation place-entity corresponding to a first evaluation geographic location that a second user was located at and a second evaluation place-entity corresponding to a second evaluation geographic location that the second user was located at within the particular timeframe of the second user being located at the first evaluation geographic location. As an example and not by way of limitation, for a particular timeframe of 24 hours, a second user may visit a restaurant at a geographic location corresponding to place-entity A then visit a gym at a geographic location corresponding to place-entity R an hour later. The pair of place-entities (A, R) may be evaluation pairs, as shown in row 402. In particular embodiments, the social-networking system 1160 may generate, for each first evaluation place-entity, an ordered list of predicted second place-entities. As an example and not by way of limitation, for a first evaluation place-entity A, an ordered list of predicted second place-entities {C, B, R} may be generated by the machine-learning model, where C may be the predicted most probable second-place entity among the list of predicted second place-entities and R may be the predicted least probable second-place entity among the list of predicted second place-entities. In particular embodiments, the social-networking system 1160 may calculate a mean-reciprocal rank associated with the machine-learning model. The mean-reciprocal rank may be based a plurality of reciprocal ranks corresponding to the plurality of evaluation pairs. Each reciprocal rank corresponding to an evaluation pair may be calculated based on the first evaluation place-entity of the evaluation pair, the second evaluation place-entity of the evaluation pair, and the ordered list of predicted second place entities corresponding to the first evaluation place-entity of the evaluation pair. As an example and not by way of limitation, place-entities A, B, and C, may each be a first evaluation place-entity and may correspond to rows 402, 404, and 406, respectively. Row 402 may show the calculation corresponding to place-entity A. The generated ordered list corresponding to place-entity A may be {C, B, R}. The corresponding evaluation pair may be (A, R). Because the second evaluation place-entity R was the third predicted second place-entity in the ordered list, row 402 may have a rank of 3 and a reciprocal rank of 1/3. Similar calculations may be performed for first evaluation place-entities B and C, and shown in rows 404 and 406, respectively. A mean-reciprocal rank may be the mean of the reciprocal ranks, which may be calculated as $$\frac{1}{3}\left(\frac{1}{3} + 1 + \frac{1}{2}\right) = \frac{11}{18},$$

or approximately 0.61. Although this disclosure describes a particular evaluation metric, this disclosure contemplates any suitable evaluation metric. Furthermore, although this disclosure describes calculating a mean-reciprocal rank in a particular manner for particular evaluation pairs, this disclosure contemplates calculating a mean-reciprocal rank in any suitable manner for suitable evaluation pairs.

In particular embodiments, the social-networking system 1160 may access a first embedding representing a first place-entity corresponding to the first geographic location. The first embedding may be a point in a d-dimensional embedding space. As an example and not by way of limitation, a client system 1130 of a user may send data to the social-networking system 1160 indicating that the user is located at a geographical latitude of 37.417423 degrees and a geographical longitude of −122.130573 degrees. The geographic location at these coordinates may be a STARBUCKS coffee house, which may correspond to a place-entity. The social-networking system 1160 may access an embedding representing a place-entity corresponding to the STARBUCKS coffee house. Although this disclosure describes accessing an embedding representing a place-entity in a particular manner, this disclosure contemplates accessing an embedding representing a place-entity in any suitable manner.

In particular embodiments, the social-networking system 1160 may access a plurality of second embeddings representing a plurality of predicted second place-entities, respectively. Each second place-entity may correspond to a second geographic location. Each second embedding may be a point in the d-dimensional embedding space. As an example and not by way of limitation, referencing FIG. 3, the social-networking system 1160 may receive data indicating that a first user is located at geographic location 302. The social-networking system 1160 may access a first embedding representing a first place-entity corresponding to first geographic location 302. The social-networking system 1160 may access second embeddings, each representing the second place-entities corresponding to the respective second geographic locations 304, 306, and 308. Although this disclosure describes accessing an embedding representing a place-entity in a particular manner, this disclosure contemplates accessing an embedding representing a place-entity in any suitable manner.

Figure 5:
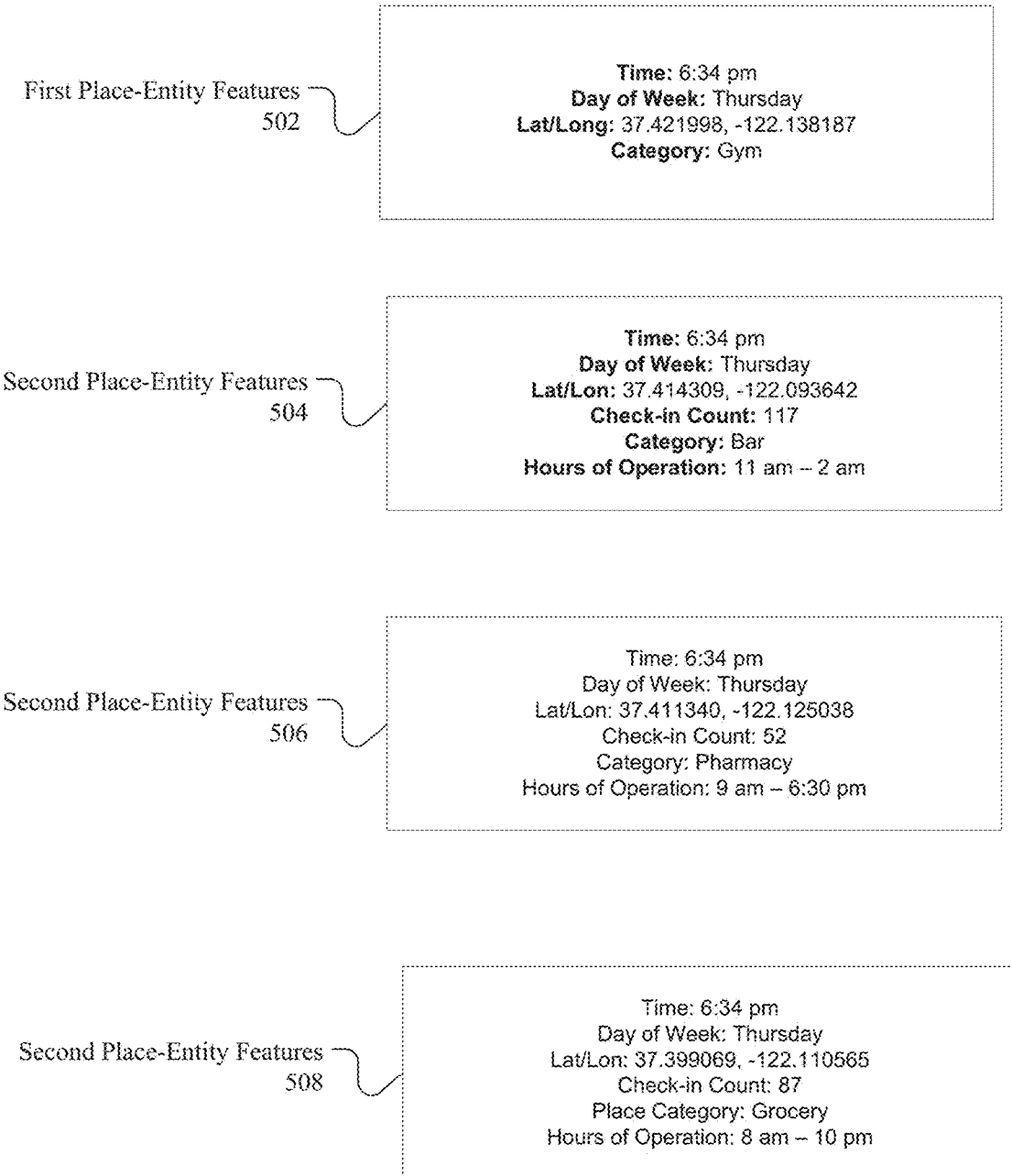
FIG. 5 illustrates example features of example place-entities.

FIG. 5 illustrates example features of example place-entities. In particular embodiments, the social-networking system 1160 may generate, using a machine-learning model, the first embedding and each of the second embeddings. In particular embodiments, the first embedding of the first place-entity may be generated based on features of the first place-entity. In particular embodiments, the plurality of second embeddings of the plurality of predicted second place-entities may be generated based on features of the respective second place-entities. In particular embodiments, the features of a place-entity may comprise a category of the place-entity, the first time, the hours of operation of a business located at a geographic location corresponding to the place-entity, popular hours of a business located at geographic location corresponding to the place-entity (e.g., hours when the business has a surge in customers), or any combination thereof. As an example and not by way of limitation, referencing FIG. 3, an embedding representing a first place-entity corresponding to a geographic location 302 may be generated. Referencing FIG. 5, the first-place entity features 502 may be the features of the first place-entity. In this example, the features using to generate the embedding of the first-place entity may comprise the hour and day of the week of the first time (6:34 pm on a Thursday), the geographic coordinates of geographic location 302 (37.421998°, −122.138187°), and the category of the first place-entity (gym). In particular embodiments, features-types of the features used to generate the first embedding of the first place-entity may not be identical to feature-types of the features used to generate the second embeddings of the second place-entities. As an example and not by way of limitation, the features used to generate a first embedding representing a first place-entity corresponding to the geographic location 302 may be the first-place entity features 502. The first-place entity features 502 may comprise the feature-types time, day of the week, geographic coordinates, and place-entity category. The features used to generate second embeddings representing a second place-entities corresponding to the geographic locations 304, 306, and 308 may be the second-place entity features 504, 506, and 508, respectively. The second-place entity features 504, 506, and 508 may each comprise the feature-types time, day of the week, geographic coordinates, check-in count, place-entity category, and hours of operation of a business at the respective geographic locations. The feature-types used to generate embeddings representing the second place-entities in this example may comprise check-in count and hours of operation, whereas the feature-types used to generate the first place-entity may not. Although this disclosure describes particular features of particular place-entities, this disclosure contemplates any suitable features of any suitable place-entities.

In particular embodiments, at least one second place-entity may correspond to a second geographic location within a predetermined geographic distance of the first geographic location. As an example and not by way of limitation, a second-place entity may correspond to a second geographic location that is located within 50 miles of the first geographic location. As another example and not by way of limitation, the social-networking system 1160 may select only predicted second place-entities that correspond to second geographic locations within 25 miles of the first geographic location. As yet another example and not by way of limitation, referencing FIG. 3, the geographic location 302 may be the first geographic location and the geographic locations 304, 306, and 308 may each be second geographic locations. The geographic locations 304, 306, and 308 may each be within 20 miles of the geographic location 302. In particular embodiments, at least one second place-entity may correspond to a second geographic location previously visited by the user. In particular embodiments, at least one second place-entity may correspond to a second geographic location visited by a second user, wherein the second user shares one or more attributes with the first user. As an example and not by way of limitation, a first user may be located at the geographic location 302. The first user may be between 18 and 24 years of age. The geographic location 304 may be selected as a second geographic location based on determining that a second user between 18 and 24 years of age previously visited the geographic location 304. Although this disclosure describes particular geographic locations, this disclosure contemplates any suitable geographic location. Furthermore, although this disclosure describes selecting particular geographic locations based on particular criteria, this disclosure contemplates selecting any suitable geographic locations based on any suitable criteria.

In particular embodiments, the social-networking system 1160 may calculate, for each of the predicted second place-entities, a similarity metric between the embedding representing the first place-entity and the embedding representing the second place-entity. The similarity metric may correspond to a probability that the first user will be located at the second geographic location corresponding to the second place entity within a particular timeframe of the first user being located at the first geographic location at the first time. As an example and not by way of limitation, an embedding $\vec{a}$ may represent first place-entity A, and second embeddings $\vec{b}$ and $\vec{c}$ may represent second place-entities B and C, respectively. A cosine similarity between $\vec{a}$ and $\vec{b}$ may be 0.24 and a cosine similarity between $\vec{a}$ and $\vec{c}$ may be 0.86. This may indicate that there is a higher probability that the first user will be located at a geographic location corresponding to C than the probability that the user will be located at a geographic locations corresponding to B within the particular timeframe. Although this disclosure describes calculating a similarity metric in a particular manner, this disclosure contemplates calculating a similarity metric in any suitable manner.

In particular embodiments, the social-networking system 1160 may rank each of the predicted second place-entities based on their calculated similarity metrics. In particular embodiments, the social-networking system 1160 may send, to the client system 1130, information associated with one or more second geographic locations corresponding to one or more second place-entities having a ranking greater than a threshold ranking. As an example and not by way of limitation, the first user may be located at geographic location A. Second place-entities B, C, D, and E, may be ranked {C, D, B, E}. Information associated with second place-entities C and D may be sent to the client system 1130 of the first user based on the ranking of C and D being above a threshold rank. Although this disclosure describes ranking place-entities and sending information in a particular manner, this disclosure contemplates ranking place-entities and sending information in any suitable manner.

Figure 6:
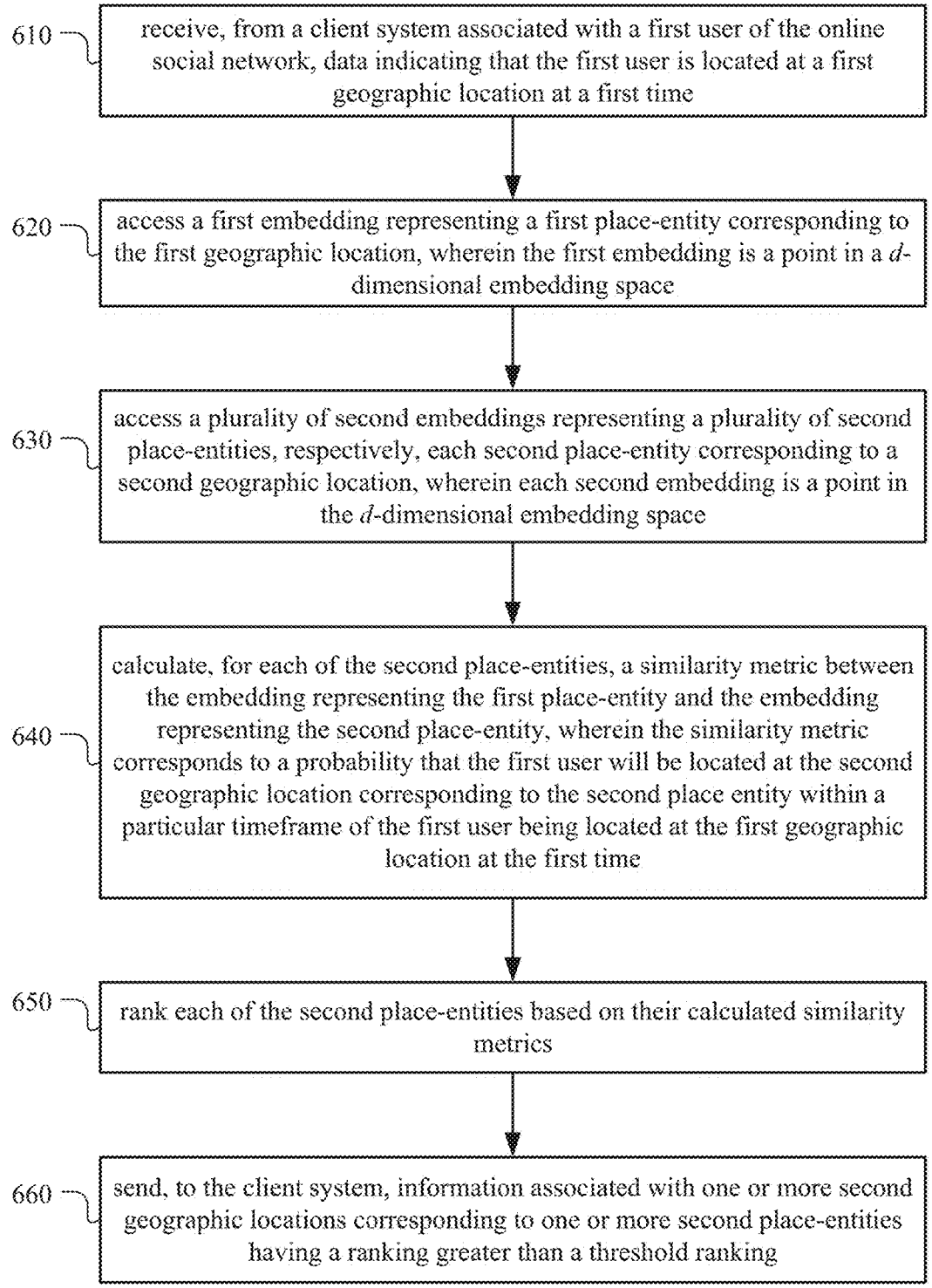
FIG. 6 illustrates an example method for predicting a second geographic location that a user will visit subsequent to the user's presence at a first geographic location.

FIG. 6 illustrates an example method 600 for predicting a second geographic location that a user will visit subsequent to the user's presence at a first geographic location. The method may begin at step 610, where the social-networking system 1160 may receive, from a client system 1130 associated with a first user of the online social network, data indicating that the first user is located at a first geographic location at a first time. At step 620, the social-networking system 1160 may access a first embedding representing a first place-entity corresponding to the first geographic location, wherein the first embedding is a point in a d-dimensional embedding space. At step 630, the social-networking system 1160 may access a plurality of second embeddings representing a plurality of predicted second place-entities, respectively, each second place-entity corresponding to a second geographic location, wherein each second embedding is a point in the d-dimensional embedding space. At step 640, the social-networking system 1160 may calculate, for each of the second place-entities, a similarity metric between the embedding representing the first place-entity and the embedding representing the second place-entity, wherein the similarity metric corresponds to a probability that the first user will be located at the second geographic location corresponding to the second place entity within a particular timeframe of the first user being located at the first geographic location at the first time. At step 650, the social-networking system 1160 may rank each of the second place-entities based on their calculated similarity metrics. At step 660, the social-networking system 1160 may send, to the client system 1130, information associated with one or more second geographic locations corresponding to one or more second place-entities having a ranking greater than a threshold ranking. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for predicting a second geographic location that a user will visit subsequent to the user's presence at a first geographic location including the particular steps of the method of FIG. 6, this disclosure contemplates any suitable method for predicting a second geographic location that a user will visit subsequent to the user's presence at a first geographic location including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Location Prediction Using Wireless Signals

In particular embodiments, the social-networking system 1160 may determine the most likely geographic location a user is located based on background signal-information from a first software application of a client system 1130 of the user and a places-API call from a second software application of the client system 1130. In particular embodiments, a technical problem arising in the field of geo-location may be to disambiguate the geographic location of a user. In particular embodiments, using background signal-information, as described in this disclosure, may be used as an alternative to or in conjunction with other location data (e.g., GPS), which may provide the advantage of more accurately or precisely determining a geographic location of a user. As an example and not by way of limitation, a user may be located at "The Old Pro." A first software application may collect and send to the social-networking system 1160 background signal-information associated with the geographic location (e.g., Wi-Fi signals at that location). The signal-information and a first client identifier of the client system 1130 may be stored in a signal-information database. The first client identifier may be hashed. The user may check-in to "The Old Pro" using a second software application. The second software application may check-in by using a places-API call of an online social network of the social-networking system 1160 to access information associated with a place-entity corresponding to the geographic location "The Old Pro." The place-entity and first client identifier may be recorded in an API-call log. The first client identifier may be hashed. The social-networking system 1160 may determine a correlation between the signal-information and the place-entity corresponding to "The Old Pro" based on matching the hash of the first client identifier in the signal-information log and the hash of the first client identifier in the API-call log. The social-networking system 1160 may update a place-entity database to indicate that the place-entity corresponding to "The Old Pro" corresponds to the background signal-information. A second client system 1130 of a second user may send background signal-information. The social-networking system 1160 may determine that the second client system 1130 is located at "The Old Pro" based on determining that the background signal-information from the second client system 1130 matches the background signal-information from the first client system 1130. Although this disclosure describes determining a most likely geographic location of a user or a client system 1130 in a particular manner, this disclosure contemplates determining a most likely geographic location of a user or a client system 1130 in any suitable manner. Furthermore, although this disclosure describes or illustrates particular embodiments as providing particular advantages, particular embodiments may provide none, some, or all of these advantages.

In particular embodiments, a geographic location may refer to a distinct, identifiable, or defined location (e.g., a particular restaurant, a particular location within a store e.g. the checkout register, an airport, a park, etc.). In particular embodiments, a geographic location may correspond to a place-entity. A place-entity may comprise data associated with a geographic location corresponding to the place-entity. In particular embodiments, a place-entity may be correspond to a node in a social graph (e.g., a concept node). Although this disclosure describes particular geographic locations and place-entities, this disclosure contemplates any suitable geographic location and any suitable place-entities.

In particular embodiments, the social-networking system 1160 may receive, from a first software application of a first client system 1130 associated with a first user of the online social network, background signal-information. The background signal-information may identify one or more first wireless signals within wireless communication range of the first client system 1130. In particular embodiments, at least one of the wireless signals may be a Wi-Fi signal, a Bluetooth signal, a cellular signal, a mobile phone signal, or a near-field communication signal. As an example and not by way of limitation, a user may be in a coffee shop. The coffee shop may provide Wi-Fi access via a wireless access point. The client system 1130 may receive a Wi-Fi signal from the Wi-Fi access point. Further, the client system 1130 may receive a mobile phone signal from a cellular network. A first software application of the client system 1130 may send information to the social-networking system 1160 associated with the Wi-Fi signal and the mobile phone signal. In particular embodiments, the first software application may be associated with an online social network of the social-networking system 1160. The online social network may have permission to access the signal-information. As an example and not by way of limitation, the user of the client system 1130 may grant the online social network permission to gather, access, and/or transmit background signal-information. In particular embodiments, the signal-information may comprise an identifier of one or more sources of the one or more wireless signals. As an example and not by way of limitation, an identifier of a source of a Wi-Fi signal may be a service set identifier (SSID), a media access control (MAC) address, or any other suitable identifier. As another example and not by way of limitation, an identifier of a source of a mobile phone signal may be a cellular system identification number (SID), a network identity number (NID), a cell identifier (CID), or any other suitable identifier. In particular embodiments, the signal-information may comprise a signal strength of the one or more wireless signals. As an example and not by way of limitation, signal-information associated with a mobile phone signal may comprise the signal strength of the mobile phone signal indicated by the transmitted power output as received by an antenna of the client system measured as decibel-microvolts per meter (dBμV/m) above a reference level of one milliwatt (dBm). Although this disclosure describes particular background signal-information identifying particular wireless signals in a particular manner, this disclosure contemplates any suitable background signal-information identifying any suitable wireless signal in any suitable manner.

In particular embodiments, the social-networking system 1160 may store the signal-information and a first client identifier for the first client system 1130 in a signal-information database. As an example and not by way of limitation, the signal-information and the first client identifier may be stored in the same row of a relational database. In particular embodiments, the social-networking system 1160 may receive, from the client system 1130, the first identifier of the client system 1130. In particular embodiments, the first client identifier may be hashed. As an example and not by way of limitation, the social-networking system 1160 may receive a unique client identifier for the client system 1130, input the unique identifier for the client system into a cryptographic hash function, and store the hashed first client identifier in the signal-information database. The social-networking system 1160 may store only the hashed identifier, which may preserve anonymity of the user and may have the effect of not retaining personally identifiable information associated with the user. In particular embodiments, the cryptographic hash function may change periodically. As an example and not by way of limitation, the cryptographic hash function may change daily. In particular embodiments, applying the cryptographic hash function to the first client identifier may comprise adding salt to the first client identifier (e.g., adding random data to the output of the hash function). Although this disclosure describes storing signal-information and hashing an identifier in a particular manner, this disclosure contemplates storing signal-information and hashing an identifier in any particular manner.

In particular embodiments, the social-networking system 1160 may receive, from a second software application of the first client system 1130 via a places-application programming interface (places-API) of the online social network, a places-API call indicating that the first client system 1130 is located at a geographic location corresponding to a first place-entity. The second software application may be separate from the first software application. In particular embodiments, the places-API may comprise a set of instructions defined at the online social network, the set of instructions being executable to enable the second software application to request information about place-entities and send location information to the online social network. In particular embodiments, the places-API call may comprise a label associated with the first place-entity. The places-API call may comprise a social action associated with the first place-entity. As an example and not by way of limitation, an online social network of the social-networking system 1160 may provide a places-API. The second software application of the user's client system 1130 may be photo-sharing application. The user may be located at the sports bar "The Old Pro" and may use the second software application to take of photograph of food using the second software application. The user may "tag" the photo as having been taken at "The Old Pro." The second software application may execute a places-API call using the places-API provided by the social-networking system 1160. The places-API call may comprise information indicating that the user is located at "The Old Pro." Although this disclosure describes a particular API and particular information indicating that a client system is located at a geographic location, this disclosure contemplates any suitable API and any suitable information indicating that a client system is located at a geographic location.

In particular embodiments, the social-networking system 1160 may record the places-API call in an API-call log. The API-call log may record the first place-entity and the first client identifier for the first client system 1130. As an example and not by way of limitation, the first place-entity and the first identifier of the client system 1130 may be stored in the same row of a relational database. In particular embodiments, the first client identifier may be hashed. As an example and not by way of limitation, the social-networking system 1160 may receive a unique client identifier for the client system 1130, input the unique identifier for the client system 1130 into a cryptographic hash function, and store the hashed first client identifier in the signal-information database. The social-networking system 1160 may store only the hashed identifier, which may preserve anonymity of the user and may have the effect of not retaining personally identifiable information associated with the user. In particular embodiments, the cryptographic hash function may change periodically. As an example and not by way of limitation, the cryptographic hash function may change daily. In particular embodiments, the applying the cryptographic hash function to the first client identifier may comprise adding salt to the first client identifier (e.g., adding random data to the output of the hash function). Although this disclosure describes storing an API call, place entity, or identifier in a particular manner, this disclosure storing an API call, place entity, or identifier any particular manner. Furthermore, although this disclosure describes hashing an identifier in a particular manner, this disclosure contemplates hashing an identifier in any suitable manner.

In particular embodiments, the social-networking system 1160 may determine a correlation between the signal-information and the first place-entity. The correlation may be determined by comparing the signal-information database and the API-call log to determine that the hash of the first client identifier in the signal-information log matches the hash of the first client identifier in the API-call log. In particular embodiments, the hash of the client identifier recorded in the API-call log may be the same as the hash of the client identifier recorded in the signal-information database (e.g., the same cryptographic hash function may be applied). This may allow a correlation between the record in the API-call log and the record in the signal-information database while maintaining the anonymity or privacy of the user associated with the client system 1130. As an example and not by way of limitation, a signal-information database may contain a record $\{C_1, S_1\}$ and the API-call log may contain the record $\{C_1, P_1\}$, where $C_1$ may be the hash of the first client identifier, $S_1$ may be the signal-information, and $P_1$ may be the first place-entity. By determining that $C_1$ is the same hash of the client identifier, a correlation between $S_1$ and $P_1$ may be determined. In particular embodiments, privacy of the user may be maintained by receiving data from the first software application and second software application subject to a privacy check (e.g., checking whether the user has enabled or allowed sharing of the data). In particular embodiments, privacy of the user may be maintained by logging data received from the first software application and second software application subject to a privacy check (e.g., checking whether the user has enabled or allowed logging of the data). In particular embodiments, the correlation is determining based on the time elapsed between receiving the signal-information and receiving the places-API call. As an example and not by way of limitation, a correlation may be determined between a signal-information database record $\{C_1, S_1\}$ and an API-call log may contain the record $\{C_1, P_1\}$ when the signal-information and the places-API call were received within 10 minutes of one another. Although this disclosure describes determining a particular correlation in a particular manner, this disclosure contemplates determining any suitable correlation in any suitable manner.

In particular embodiments, the social-networking system 1160 may update a place-entity database to indicate that the first place-entity corresponds to the one or more first wireless signals identified by the signal-information. As an example and not by way of limitation, a correlation between $S_1$ and $P_1$ may be determined, where $S_1$ may be the signal-information, and $P_1$ may be the first place-entity. The signal-information $S_1$ may identify one or more first wireless signals $W_1$. The social-networking system 1160 may update a place-entity database by adding an entry $\{P_1, W_1\}$, which may indicate that that the first place-entity $P_1$ corresponds to the one or more first wireless signals $W_1$. Although this disclosure describes updating a database to indicate a correspondence in a particular manner, this disclosure contemplates updating a database to indicate a correspondence in any suitable manner.

Figure 7:
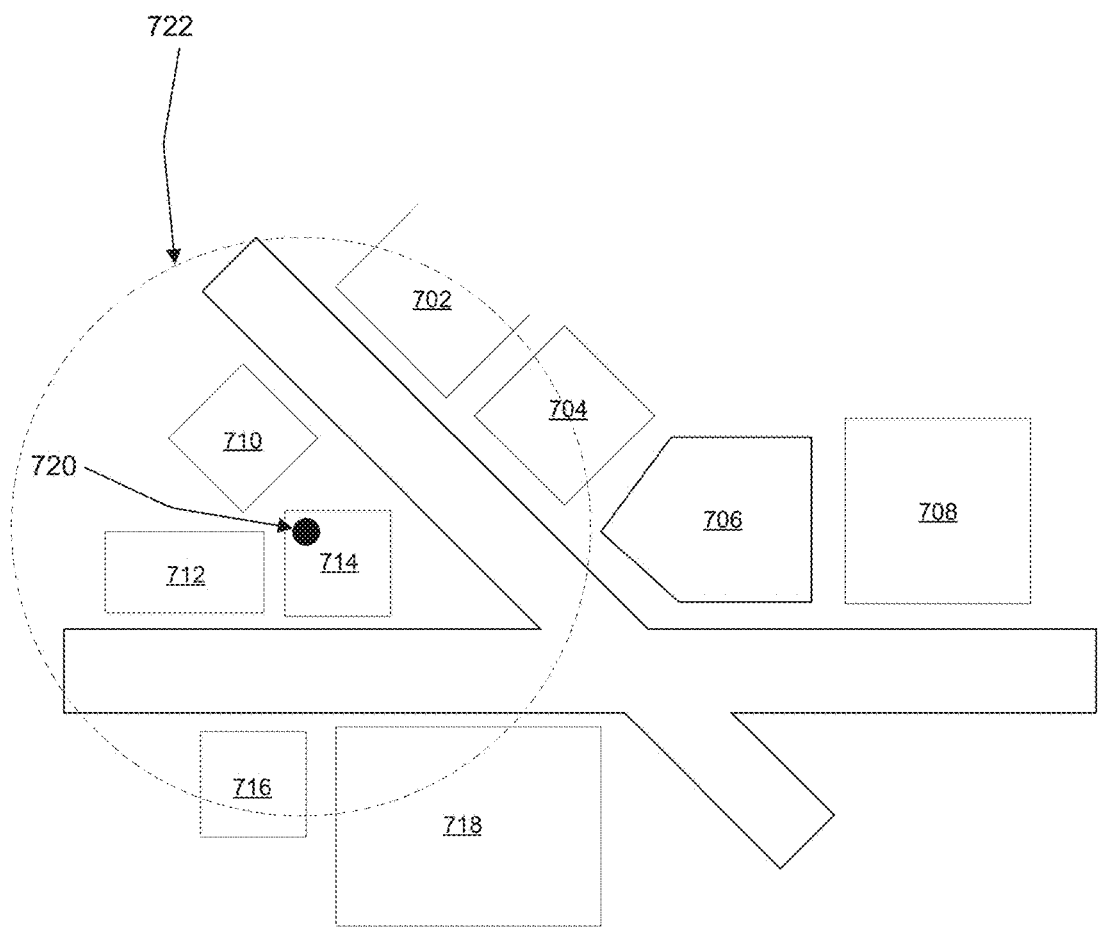
FIG. 7 illustrates an example map graphically representing example geographic locations.

FIG. 7 illustrates an example map graphically representing example geographic locations 702-718. In this example, the point 720 may indicate a current location of a user. The user in this example may be located at a geographic location 714. In particular embodiments, one technical problem in the field of geo-location may be to disambiguate the geographic location of a user. As an example and not by way of limitation, the client system 1130 of the user may use a GPS signal to determine its approximate location. In the example of FIG. 7, the client system 1130 may determine its location to be approximately within the area indicated by area 722. Determining location by GPS may be uncertain due to circumstances such as the geometry of the GPS satellite, blockage of the GPS signal, atmospheric conditions, design quality of the GPS receiver of the client system 1130, or other such factors. In the example of FIG. 7, the GPS signal may be unable to accurately determine that the user is located at geographic location 714, as geographic locations 702, 704, 710, 712, 716, and 718 are also within area 722. In particular embodiments, using background signal-information, as described in this disclosure, may be used as an alternative to or in conjunction with other location data (e.g., GPS), which may provide the advantage of more accurately or precisely determining a geographic location of a user. Although this disclosure describes or illustrates particular embodiments as providing particular advantages, particular embodiments may provide none, some, or all of these advantages.

In particular embodiments, the social-networking system 1160 may use information stored in the place-entity database to determine a location of a second user. In particular embodiments, the social-networking system 1160 may receive, from a second client system 1130 of a second user, background signal-information identifying one or more second wireless signals within wireless communication range of the second client system 1130. As an example and not by way of limitation, referencing FIG. 7, the second user may be located at a geographic location 714, indicated by point 720. The geographic location 714 may be a café with a Wi-Fi router. The Wi-Fi router of the geographic location 714 may broadcast a Wi-Fi signal with an SSID of "Cool Café Wifi" with a signal strength of −35 dBm relative to the client system 1130. The geographic location 710 may broadcast a Wi-Fi signal via an access point with an SSID of "Other Business Wifi" with a signal strength of −67 dBm relative to the client system 1130. The social-networking system 1160 may receive, from the second client system 1130 of the second user, background signal-information identifying the wireless signals from the Wi-Fi router of the geographic location 714 and the access point of the geographic location 710. The background signal-information may comprise the SSIDs and signal strength of the wireless signals. Although this disclosure describes receiving particular background signal-information comprising particular information from a user located at a particular geographic location, this disclosure contemplates receiving any suitable background signal-information comprising any suitable information from a user located at any suitable geographic location.

In particular embodiments, the social-networking system 1160 may determine that the one or more second wireless signals match the one or more first wireless signals. As an example and not by way of limitation, the one or more wireless signals $W_1$ may be represented in the form {SSID, dBm}. In this example, $W_1$ may be:

{{Cool Café Wifi,−35 dBm},{Other Business Wifi,−65 dBm},{Far Wifi,−88 dBm}}.

The social-networking system 1160 may receive from the second client system signal-information $S_2$ identifying wireless signals $W_2$, which may be:

{{Cool Café Wifi,−35 dBm},{Other Business Wifi,−67 dBm}}.

The social-networking system 1160 may determine that $W_1$ and $W_2$ match based on a similarity between the SSIDs and the signal strengths of the wireless signals $W_1$ and $W_2$. In this example, a match between wireless signals may be determined when the SSIDs of $W_1$ and $W_2$ are identical and the corresponding signal strengths are within a threshold amount of one another. The social-networking system 1160 may determine that {Far Wifi, −88 dBm} of $W_1$ has a low signal strength that $W_1$ and $W_2$ may match despite $W_2$ containing no corresponding wireless signal information (e.g., the second client system 1130 may not receive the wireless signal due to the low-signal strength). Although this disclosure describes matching one or more particular wireless signals in a particular manner, this disclosure contemplates matching any suitable one or more wireless signals in any suitable manner.

In particular embodiments, the social-networking system 1160 may determine that the second client system 1130 is located at a geographic location associated with the first place-entity based on the indication in the place-entity database that the one or more first wireless signals correspond to the first place-entity. As an example and not by way of limitation, the social-networking system 1160 may determine that the one or more first wireless signals $W_1$ match the one or more second wireless signals $W_2$. The place-entity database may have been updated with the entry the place-entity database may have been updated with the entry {$P_1$, $W_1$}, which may indicate that that the first place-entity $P_1$ corresponds to the one or more first wireless signals $W_1$. The social-networking system 1160 may determine that the second user is located at the geographic location corresponding to the first place-entity $P_1$ based on the entry {$P_1$, $W_1$} in the place-entity database and the determination that $W_1$ and $W_2$ match. In particular embodiments, determining that the second client system 1130 is located at the geographic location associated with the first place-entity may be further based on location data received from the second client system 1130. As an example and not by way of limitation, referencing FIG. 7, other location data may indicate that the second user is located within the area 722. Determining a match between $W_2$ may comprise finding the closest match between $W_2$ and wireless signals corresponding to geographic locations within the area 722. Although this disclosure describes determining a location of a client system 1130 in a particular manner, this disclosure contemplates determining a location of a client system 1130 in any suitable manner.

In particular embodiments, the social-networking system 1160 may send, to the second client system 1130, information associated with the first place-entity. As an example and not by way of limitation, the social-networking system 1160 may send a prompt to perform a social action associated with the first-place entity (e.g., a prompt to "like" or "check in" at a business associated with the first-place entity). As another example and not by way of limitation, the social-networking system 1160 may send information associated with products sold at a business associated with the first-place entity. Although this disclosure describes sending particular information in a particular manner, this disclosure contemplates sending any suitable information in any suitable manner.

Figure 8:
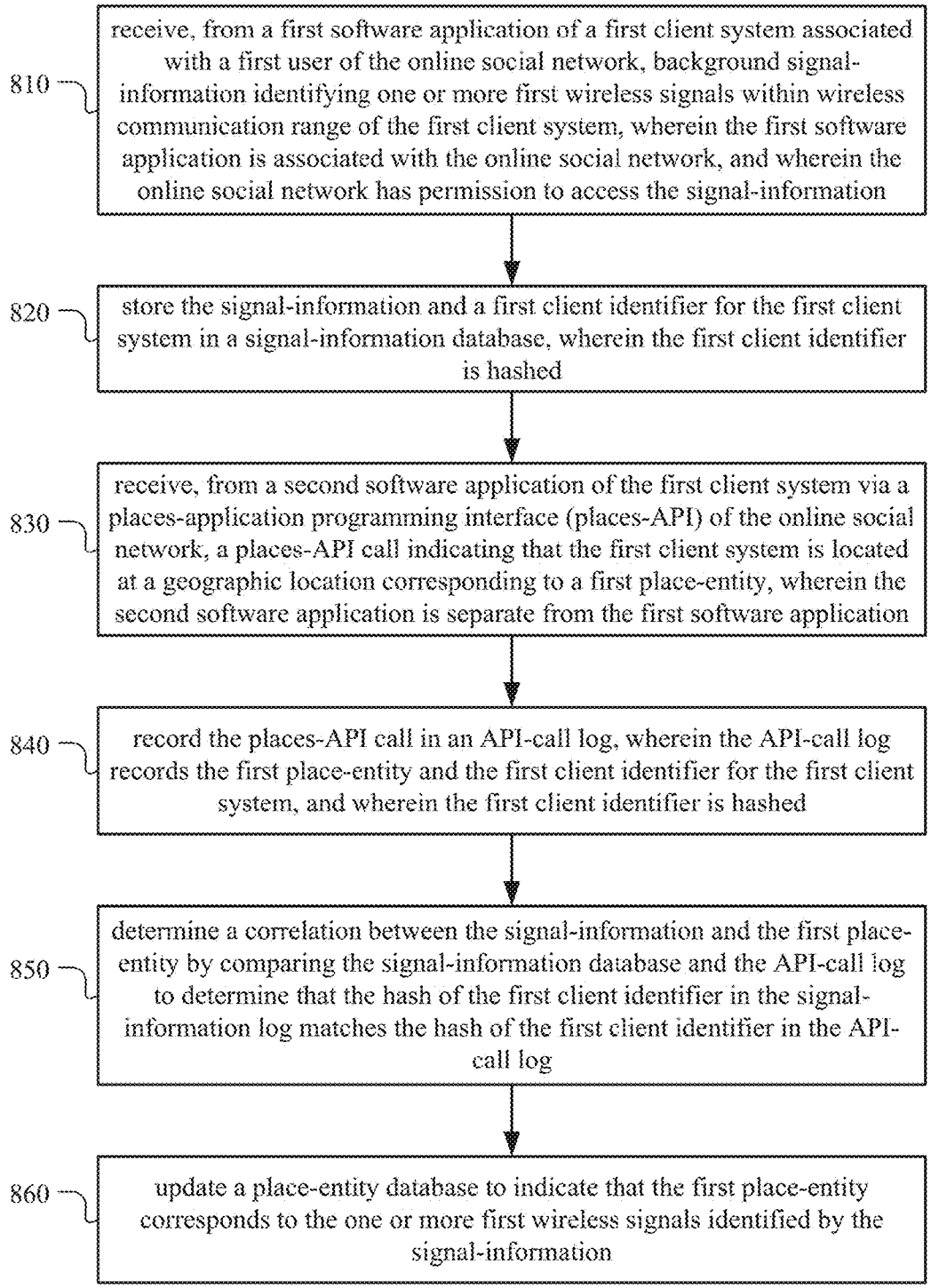
FIG. 8 illustrates an example method for correlating signal-information and place-entities.

FIG. 8 illustrates an example method 800 for correlating signal-information and place-entities. The method may begin at step 810, where the social-networking system 1160 may receive, from a first software application of a first client system 1130 associated with a first user of the online social network, background signal-information identifying one or more first wireless signals within wireless communication range of the first client system 1130, wherein the first software application is associated with the online social network, and wherein the online social network has permission to access the signal-information. At step 820, the social-networking system 1160 may store the signal-information and a first client identifier for the first client system in a signal-information database, wherein the first client identifier is hashed. At step 830, the social-networking system 1160 may receive, from a second software application of the first client system via a places-application programming interface (places-API) of the online social network, a places-API call indicating that the first client system is located at a geographic location corresponding to a first place-entity, wherein the second software application is separate from the first software application. At step 840, the social-networking system 1160 may record the places-API call in an API-call log, wherein the API-call log records the first place-entity and the first client identifier for the first client system 1130, and wherein the first client identifier is hashed. At step 850, the social-networking system 1160 may determine a correlation between the signal-information and the first place-entity by comparing the signal-information database and the API-call log to determine that the hash of the first client identifier in the signal-information log matches the hash of the first client identifier in the API-call log. At step 860, the social-networking system 1160 may update a place-entity database to indicate that the first place-entity corresponds to the one or more first wireless signals identified by the signal-information. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for correlating signal-information and place-entities including the particular steps of the method of FIG. 8, this disclosure contemplates any suitable method for correlating signal-information and place-entities including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Cross-Validating Places

In particular embodiments, the social-networking system 1160 may identify place-entities corresponding to invalid geographic locations based on information associated with place-entity nodes each corresponding to the geographic location. In particular embodiments, information associated with a place-entity in a place-entities graph may be from a source such as user-created pages, pages from the internet, WIKIPEDIA, from users via the Open Graph protocol, or any other suitable source. In particular embodiments, a technical problem arising in the field of place-entities graphs may be providing users with information associated with valid place-entities. Because information about place-entities may originate from many sources, some of which have higher quality information than others, information about place-entities may include low-quality or invalid information. In particular embodiments, low-quality or invalid place-entities may be automatically detected and filtered (e.g., place-entities corresponding to a geographic location that does not exist, duplicate place-entities, non-public or user-specific places, etc.). The technical solutions described herein of automatically detecting and filtering invalid place-entities may improve computing processes related to storing and searching for place-entities, which may reduce the computing resources needed for such processes while still providing high quality information to users in an automatic manner. Furthermore, the technical solutions described herein may reduce or eliminate the need to manually review place-entities to determine whether the place-entities are valid and may reduce the data throughput required to respond to a query by filtering out invalid place-entity results. In particular embodiments, a place-entity cluster may comprise a plurality of place-entity nodes corresponding to a plurality of respective place-entities, each place-entity corresponding to the same geographic location. In particular embodiments, using information from multiple place-entity nodes in a place-entity cluster may provide information that indicates whether the place-entity nodes correspond to an invalid geographic location. A cluster-quality score may be calculated for a place-entity cluster based on a plurality of embeddings representing a plurality of respective place-entities of the place-entity cluster. In particular embodiments, place-entity nodes of a place-entity cluster may be flagged as being of high quality, and may be used in a "premium" or "verified" place-entity graph based on determining that the cluster-quality score is above a threshold score. In particular embodiments, place-entity nodes of a place-entity cluster associated with a cluster-quality score below a threshold score may be reclassified as a non-place-entity node, suppressed or filtered during a search, or ranked lower in a search. Although this disclosure describes determining whether a place-entity corresponds to a valid or invalid geographic location in a particular manner, this disclosure contemplates determining whether a place-entity corresponds to a valid or invalid geographic location in any suitable manner. Furthermore, although this disclosure describes or illustrates particular embodiments as providing particular advantages, particular embodiments may provide none, some, or all of these advantages.

In particular embodiments, the social-networking system 1160 may access a place-entities graph comprising a plurality of place-entity nodes. In particular embodiments, a place-entities graph may represent a plurality of place-entity nodes each corresponding to a place-entity having a particular geographic location. In particular embodiments, a place-entity node may be a concept node 1204. Each place-entity node may represent a place-entity corresponding to a particular geographic location. Each edge between two nodes may establish a single degree of separation between them. Although this disclosure describes particular place-entity nodes in a particular place-entities graph, this disclosure contemplates any suitable place-entity nodes in any suitable place-entities graph.

Figure 9:
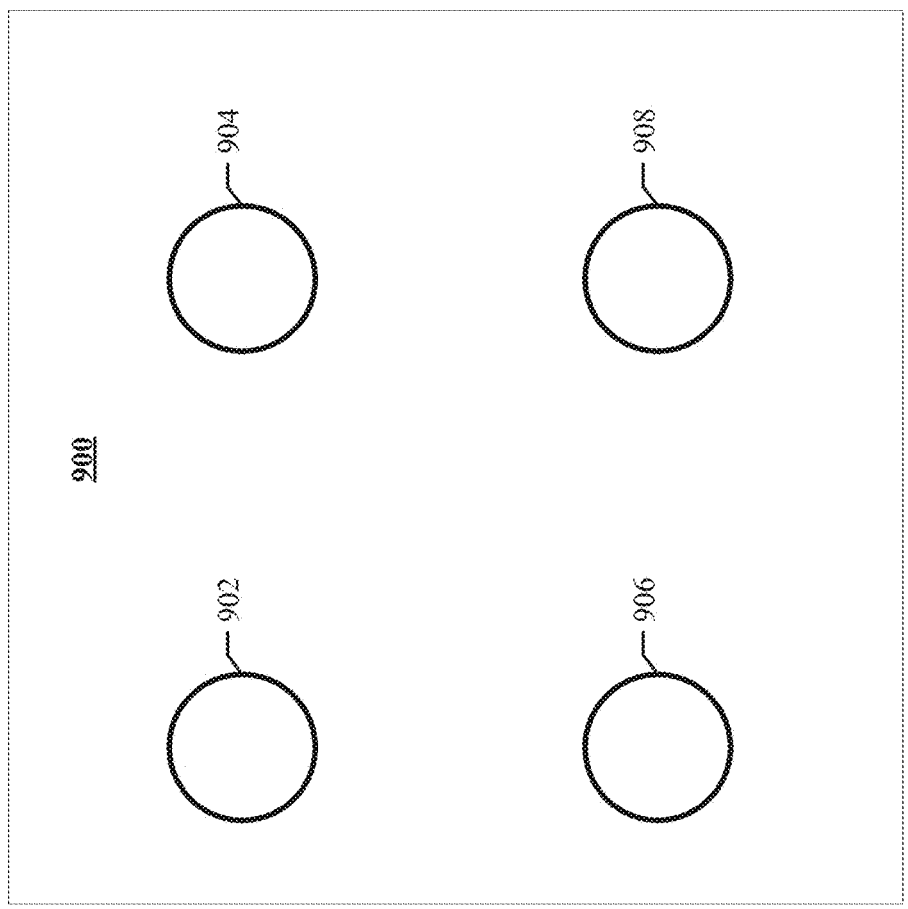
FIG. 9 illustrates an example place-entity cluster.

FIG. 9 illustrates an example place-entity cluster 900. In particular embodiments, the social-networking system 1160 may identify a place-entity cluster within the place-entities graph. The place-entity cluster may comprise a plurality of place-entity nodes corresponding to a plurality of place-entities, respectively. Each place-entity of a place-entity cluster may correspond to the same geographic location. In particular embodiments, each place-entity cluster may comprise place-entity nodes having duplication-values with respect to a canonical place-entity node in the place-entity cluster above a threshold duplication-value. In particular embodiments, a deduplication process may identify similar or duplicate place-entity nodes and create place-entity clusters based on the identification. A pairwise duplication comparison may be performed to generate a duplication-score for a particular pair of place-entity nodes. A determination of duplicate place-entities may be a determination that two or more place-entity nodes are referring to the same place-entity or geographic location. As an example and not by way of limitation, a place-entity node "New York City" and a place-entity node "I Heart NYC" may both refer to the geographic location of the city of New York, N.Y. As another example and not by way of limitation, referencing FIG. 9, cluster 900 may comprise place-entity nodes 902-908.

Place-entity nodes 902-908 may each refer to a geographic location associated with a restaurant called "The Golden Goose." In particular embodiments, place-entity clusters may be created based on the duplication-scores, where a particular cluster may correspond to the same place-entity. In particular embodiments, a place-entity cluster may include canonical place-entity, as determined by a best-page selection process. As an example and not by way of limitation, an official page of social-networking system 1160 for "New York City" may be recognized as the canonical place-entity for New York City, N.Y., while a page titled "The City That Never Sleeps" may be determined to be a lower-quality, duplicate place-entity. Although this disclosure describes particular place-entities and particular place-entity clusters, this disclosure contemplates any suitable place entities and any suitable place-entity clusters. Furthermore, although this disclosure describes clustering place-entity nodes, deduplication of place-entity nodes, and identifying canonical place-entity nodes in a particular manner, this disclosure contemplates clustering place-entity nodes, deduplication of place-entity nodes, and identifying canonical place-entity nodes in any suitable manner.

More information on geo-location, place-entities, place-entity nodes, place-entities graphs, deduplication, and canonical nodes may be found in U.S. patent application Ser. No. 15/192,702, filed 24 Jun. 2016, which is incorporated by reference.

In particular embodiments, the social-networking system 1160 may access a plurality of embeddings representing the plurality of place-entities corresponding to the place-entity cluster, respectively. Each embedding may be a point in a d-dimensional embedding space. In particular embodiments, for each place-entity of the plurality of place-entities, the social-networking system 1160 may generate the embedding representing the place-entity. For each place-entity, the embedding representing the place-entity may be generated based at least in part on one or more of a source of information associated with the place-entity, a date of information associated with the place-entity, an accuracy of attributes of the place-entity, a number of photos associated with the place-entity, an amount of content associated with the place-entity, a recency-value associated with the content or photos, or a number of social signals associated with the place-entity. In particular embodiments, the source of information associated with at least one place-entity may be a user of the online social network or a third-party system 1170. In particular embodiments, each embedding representing a place-entity may be generated based at least in part on whether the place-entity has an entity-quality score less than a threshold entity-quality score. As an example and not by way of limitation, referencing FIG. 9, place entity-node 902 may correspond to a place-entity that was created by a user, has 14 associated photos, and was created 3 weeks prior to generating an embedding representing the place-entity. An embedding representing the place-entity corresponding to place-entity node 902 may be generated based on the source of the place-entity, the number of photos associated with the place-entity, and a recency-value. Although this disclosure describes accessing or generating an embedding representing a place-entity in a particular manner, this disclosure contemplates accessing or generating an embedding representing a place-entity in any suitable manner.

In particular embodiments, the social-networking system 1160 may calculate, for each place-entity, an entity-quality score of the place-entity. In particular embodiments, the entity-quality score may be calculated by using a machine-learning model. As an example and not by way of limitation, place-entities with a greater number of associated photos may receive a higher quality-score than place-entities with a lower number of associated photos. As another example and not by way of limitation, place-entities with a higher number of number of social signals associated with the place-entity (e.g., check-ins, likes, etc.) may receive a higher quality-score than place-entities with a lower number of social signals associated with the place-entity. Although this disclosure describes calculating an entity-quality score in a particular manner, this disclosure contemplates calculating an entity-quality score in any suitable manner.

In particular embodiments, the social-networking system 1160 may calculate, using a machine-learning model, a cluster-quality score of the place-entity cluster based on the plurality of embeddings representing the place-entities corresponding to the place-entity cluster. As an example and not by way of limitation, a cluster-quality score for a place-entity cluster comprising place-entities with a higher average quality-score may be higher than a place-entity cluster comprising place-entities with a higher average quality-score. As another example and not by way of limitation, a cluster-quality score for a place-entity cluster comprising more place-entities may be higher than a place-entity cluster comprising fewer place-entities. In particular embodiments, the cluster-quality score may represent a probability that the place-entities corresponding to the place-entity cluster correspond to a valid geographic location. In particular embodiments, a valid geographic location may refer to a geographic location that meets particular criteria. As an example and not by way of limitation, a valid geographic location may be a geographic location that actually exists and is the location of a business open to the public. As another example and not by way of limitation, a user may create a place-entity called "Love," which may correspond to the concept of love rather than an actual geographic location. The place-entity "Love" may be identified as corresponding to an invalid geographic location. Although this disclosure describes calculating a cluster-quality score in a particular manner, this disclosure contemplates calculating a cluster-quality score in any suitable manner.

In particular embodiments, the social-networking system 1160 may identify the place-entities corresponding to the place-entity cluster as corresponding to an invalid geographic location based on a determining that the cluster-quality score is less than a threshold cluster-quality score. As an example and not by way of limitation, a cluster-quality score may range from 0 to 1. A threshold cluster-quality score may be 0.6. Referencing FIG. 9, place-entity cluster 900 may have a cluster-quality score of 0.5. Based on determining that the cluster-quality score of place-entity cluster 900 is below the threshold cluster-quality, the place-entities corresponding to place-entity nodes 902-908 may be identified as corresponding to an invalid location. Although this disclosure describes identifying place-entities as corresponding to an invalid geographic location in a particular manner, this disclosure contemplates identifying place-entities as corresponding to an invalid geographic location in any suitable manner.

In particular embodiments, the social-networking system 1160 may receive, from a client system 1130 associated with a user, a query comprising one or more n-grams. In particular embodiments, the social-networking system 1160 may identify one or more place-entities matching at least a portion of the query. The identified place-entities may comprise at least one place-entity corresponding to the place-entity cluster. In particular embodiments, the social-networking system 1160 may calculate, for each identified place-entity, a relevance score. In particular embodiments, the social-networking system 1160 may rank the identified place-entities based at least in part on their respective relevance scores. Each identified place-entity corresponding to the place-entity cluster may be ranked lower than each identified place-entity not corresponding to the place-entity cluster. In particular embodiments, the social-networking system 1160 may send, to the client system 1130 responsive to the query, instructions for presenting a search-results page, the search-results page comprising one or more search results corresponding to the one or more identified place-entities, respectively. The search-results page displays the search results ordered by the rank of the corresponding identified place-entities. As an example and not by way of limitation, a user may submit a query comprising the n-gram "hope". A place-entity "Hope for the future" and a place-entity "Hope, British Columbia, Canada" may be identified. The place-entity "Hope for the future" may correspond to the place-entities cluster and may be identified as corresponding to an invalid geographic location. The place-entity "Hope, British Columbia, Canada" may not correspond to the place-entities cluster and may be correspond to a valid geographic location (e.g., a municipality). The place-entity "Hope, British Columbia, Canada" may be ranker higher than the place-entity "Hope for the future". Although this disclosure describes querying and ranking particular place-entities in a particular manner, this disclosure contemplates querying and ranking any suitable place-entities in any suitable manner.

In particular embodiments, the social-networking system 1160 may receive, from a client system 1130 associated with a user, a query comprising one or more n-grams. In particular embodiments, the social-networking system 1160 may identify one or more place-entities matching at least a portion of the query. The identified place-entities may comprise at least one place-entity corresponding to the place-entity cluster. In particular embodiments, the social-networking system 1160 may send, to the client system 1130 responsive to the query, instructions for presenting a search-results page. The search-results page may comprise one or more search results corresponding to the one or more identified place-entities, respectively. Each search result may correspond to an identified place-entity that does not correspond to the place-entity cluster. As an example and not by way of limitation, a user may submit a query comprising the n-gram "hope". A place-entity "Hope for the future" and a place-entity "Hope, British Columbia, Canada" may be identified. The place-entity "Hope for the future" may correspond to the place-entities cluster and may be identified as corresponding to an invalid geographic location. The place-entity "Hope, British Columbia, Canada" may not correspond to the place-entities cluster and may be correspond to a valid geographic location (e.g., a municipality). A search result may correspond to the place-entity "Hope, British Columbia, Canada" and there may be no search result corresponding to the place-entity "Hope for the future". Although this disclosure describes querying particular place-entities in a particular manner, this disclosure contemplates querying any suitable place-entities in any suitable manner.

Figure 10:
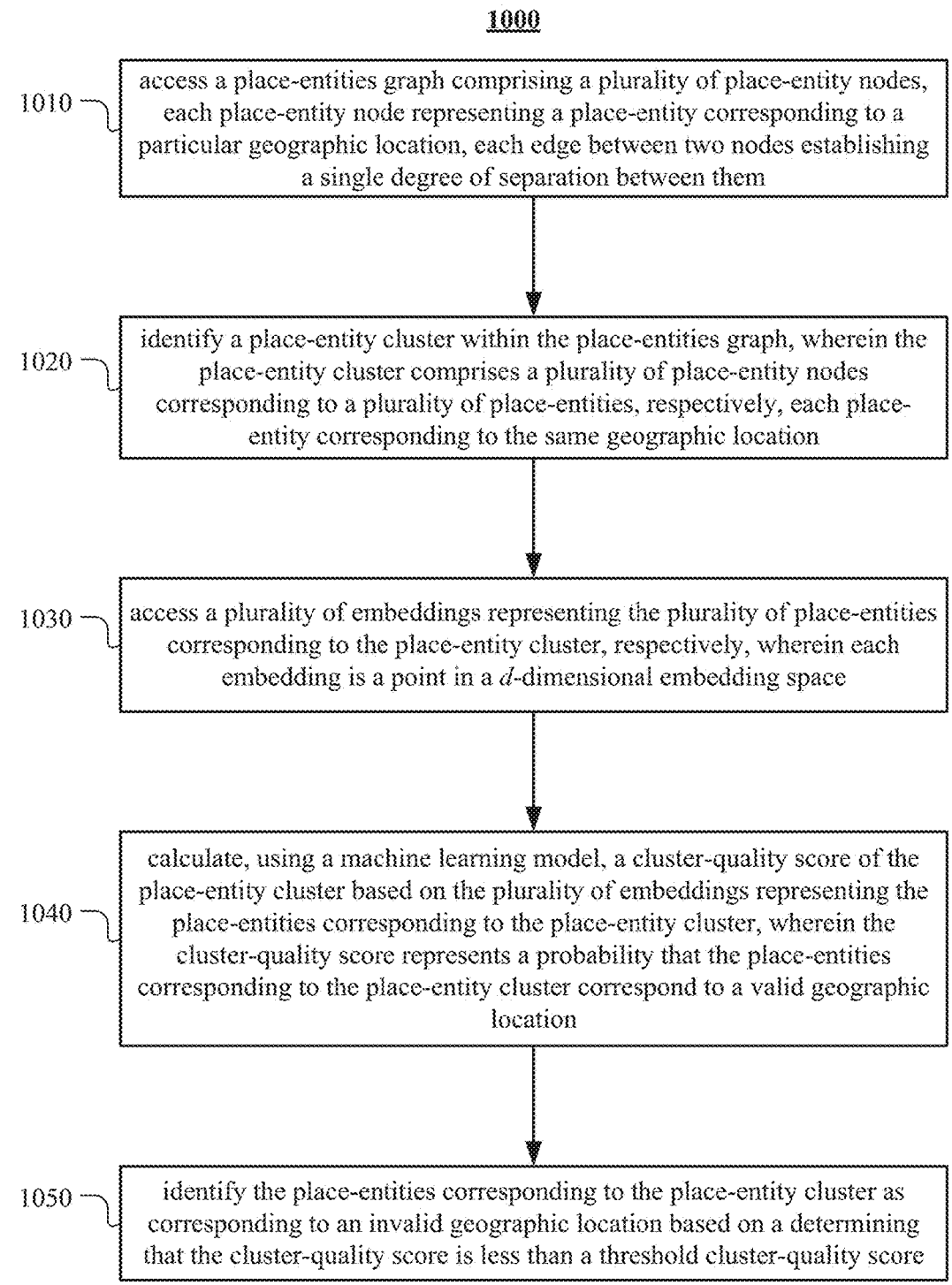
FIG. 10 illustrates an example method 1000 for identifying place-entities corresponding to an invalid geographic location.

FIG. 10 illustrates an example method 1000 for identifying place-entities corresponding to an invalid geographic location. The method may begin at step 1010, where the social-networking system 1160 may access a place-entities graph comprising a plurality of place-entity nodes, each place-entity node representing a place-entity corresponding to a particular geographic location, each edge between two nodes establishing a single degree of separation between them. At step 1020, the social-networking system 1160 may identify a place-entity cluster within the place-entities graph, wherein the place-entity cluster comprises a plurality of place-entity nodes corresponding to a plurality of place-entities, respectively, each place-entity corresponding to the same geographic location. At step 1030, the social-networking system 1160 may access a plurality of embeddings representing the plurality of place-entities corresponding to the place-entity cluster, respectively, wherein each embedding is a point in a d-dimensional embedding space. At step 1040, the social-networking system 1160 may calculate, using a machine-learning model, a cluster-quality score of the place-entity cluster based on the plurality of embeddings representing the place-entities corresponding to the place-entity cluster, wherein the cluster-quality score represents a probability that the place-entities corresponding to the place-entity cluster correspond to a valid geographic location. At step 1050, the social-networking system 1160 may identify the place-entities corresponding to the place-entity cluster as corresponding to an invalid geographic location based on a determining that the cluster-quality score is less than a threshold cluster-quality score. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for identifying place-entities corresponding to an invalid geographic location including the particular steps of the method of FIG. 10, this disclosure contemplates any suitable method for identifying place-entities corresponding to an invalid geographic location including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

System Overview

Figure 11:
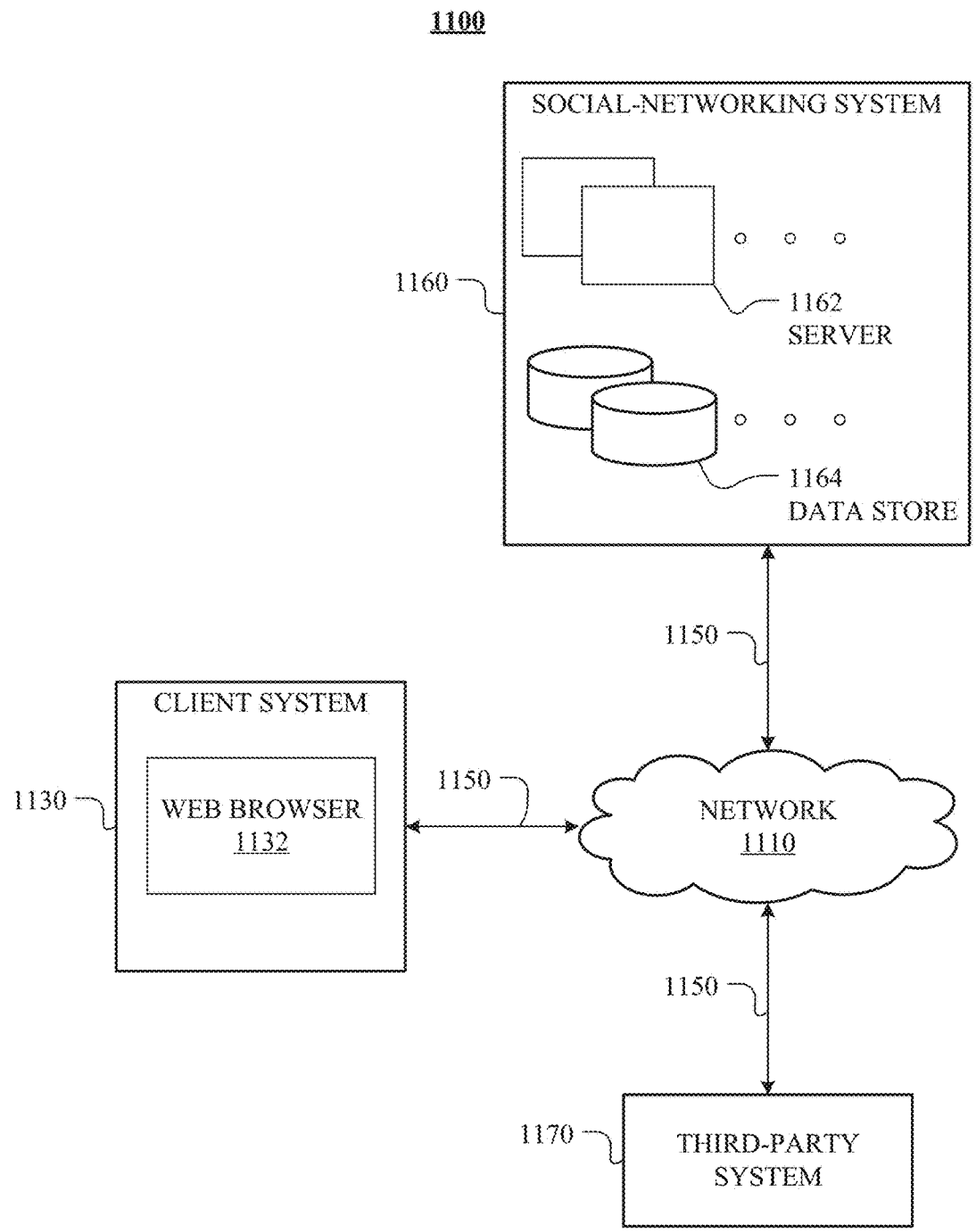
FIG. 11 illustrates an example network environment associated with a social-networking system.

FIG. 11 illustrates an example network environment 1100 associated with a social-networking system. Network environment 1100 includes a client system 1130, a social-networking system 1160, and a third-party system 1170 connected to each other by a network 1110. Although FIG. 11 illustrates a particular arrangement of client system 1130, social-networking system 1160, third-party system 1170, and network 1110, this disclosure contemplates any suitable arrangement of client system 1130, social-networking system 1160, third-party system 1170, and network 1110. As an example and not by way of limitation, two or more of client system 1130, social-networking system 1160, and third-party system 1170 may be connected to each other directly, bypassing network 1110. As another example, two or more of client system 1130, social-networking system 1160, and third-party system 1170 may be physically or logically co-located with each other in whole or in part. Moreover, although FIG. 11 illustrates a particular number of client systems 1130, social-networking systems 1160, third-party systems 1170, and networks 1110, this disclosure contemplates any suitable number of client systems 1130, social-networking systems 1160, third-party systems 1170, and networks 1110. As an example and not by way of limitation, network environment 1100 may include multiple client system 1130, social-networking systems 1160, third-party systems 1170, and networks 1110.

This disclosure contemplates any suitable network 1110. As an example and not by way of limitation, one or more portions of network 1110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1110 may include one or more networks 1110.

Links 1150 may connect client system 1130, social-networking system 1160, and third-party system 1170 to communication network 1110 or to each other. This disclosure contemplates any suitable links 1150. In particular embodiments, one or more links 1150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1150, or a combination of two or more such links 1150. Links 1150 need not necessarily be the same throughout network environment 1100. One or more first links 1150 may differ in one or more respects from one or more second links 1150.

In particular embodiments, client system 1130 may be an electronic device including hardware, software, or embedded logic components or a combination of two or more such components and capable of carrying out the appropriate functionalities implemented or supported by client system 1130. As an example and not by way of limitation, a client system 1130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1130. A client system 1130 may enable a network user at client system 1130 to access network 1110. A client system 1130 may enable its user to communicate with other users at other client systems 1130.

In particular embodiments, client system 1130 may include a web browser 1132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1130 may enter a Uniform Resource Locator (URL) or other address directing the web browser 1132 to a particular server (such as server 1162, or a server associated with a third-party system 1170), and the web browser 1132 may generate a Hyper Text Transfer Protocol (HTTP) request and communicate the HTTP request to server. The server may accept the HTTP request and communicate to client system 1130 one or more Hyper Text Markup Language (HTML) files responsive to the HTTP request. Client system 1130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1160 may be a network-addressable computing system that can host an online social network. Social-networking system 1160 may generate, store, receive, and send social-networking data, such as, for example, user-profile data, concept-profile data, social-graph information, or other suitable data related to the online social network. Social-networking system 1160 may be accessed by the other components of network environment 1100 either directly or via network 1110. As an example and not by way of limitation, client system 1130 may access social-networking system 1160 using a web browser 1132, or a native application associated with social-networking system 1160 (e.g., a mobile social-networking application, a messaging application, another suitable application, or any combination thereof) either directly or via network 1110. In particular embodiments, social-networking system 1160 may include one or more servers 1162. Each server 1162 may be a unitary server or a distributed server spanning multiple computers or multiple datacenters. Servers 1162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1162 may include hardware, software, or embedded logic components or a combination of two or more such components for carrying out the appropriate functionalities implemented or supported by server 1162. In particular embodiments, social-networking system 1160 may include one or more data stores 1164. Data stores 1164 may be used to store various types of information. In particular embodiments, the information stored in data stores 1164 may be organized according to specific data structures. In particular embodiments, each data store 1164 may be a relational, columnar, correlation, or other suitable database. Although this disclosure describes or illustrates particular types of databases, this disclosure contemplates any suitable types of databases. Particular embodiments may provide interfaces that enable a client system 1130, a social-networking system 1160, or a third-party system 1170 to manage, retrieve, modify, add, or delete, the information stored in data store 1164.

In particular embodiments, social-networking system 1160 may store one or more social graphs in one or more data stores 1164. In particular embodiments, a social graph may include multiple nodes—which may include multiple user nodes (each corresponding to a particular user) or multiple concept nodes (each corresponding to a particular concept)—and multiple edges connecting the nodes. Social-networking system 1160 may provide users of the online social network the ability to communicate and interact with other users. In particular embodiments, users may join the online social network via social-networking system 1160 and then add connections (e.g., relationships) to a number of other users of social-networking system 1160 to whom they want to be connected. Herein, the term "friend" may refer to any other user of social-networking system 1160 with whom a user has formed a connection, association, or relationship via social-networking system 1160.

In particular embodiments, social-networking system 1160 may provide users with the ability to take actions on various types of items or objects, supported by social-networking system 1160. As an example and not by way of limitation, the items and objects may include groups or social networks to which users of social-networking system 1160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1160 or by an external system of third-party system 1170, which is separate from social-networking system 1160 and coupled to social-networking system 1160 via a network 1110.

In particular embodiments, social-networking system 1160 may be capable of linking a variety of entities. As an example and not by way of limitation, social-networking system 1160 may enable users to interact with each other as well as receive content from third-party systems 1170 or other entities, or to allow users to interact with these entities through an application programming interfaces (API) or other communication channels.

In particular embodiments, a third-party system 1170 may include one or more types of servers, one or more data stores, one or more interfaces, including but not limited to APIs, one or more web services, one or more content sources, one or more networks, or any other suitable components, e.g., that servers may communicate with. A third-party system 1170 may be operated by a different entity from an entity operating social-networking system 1160. In particular embodiments, however, social-networking system 1160 and third-party systems 1170 may operate in conjunction with each other to provide social-networking services to users of social-networking system 1160 or third-party systems 1170. In this sense, social-networking system 1160 may provide a platform, or backbone, which other systems, such as third-party systems 1170, may use to provide social-networking services and functionality to users across the Internet.

In particular embodiments, a third-party system 1170 may include a third-party content object provider. A third-party content object provider may include one or more sources of content objects, which may be communicated to a client system 1130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1160 also includes user-generated content objects, which may enhance a user's interactions with social-networking system 1160. User-generated content may include anything a user can add, upload, send, or "post" to social-networking system 1160. As an example and not by way of limitation, a user communicates posts to social-networking system 1160 from a client system 1130. Posts may include data such as status updates or other textual data, location information, photos, videos, links, music or other similar data or media. Content may also be added to social-networking system 1160 by a third-party through a "communication channel," such as a newsfeed or stream.

In particular embodiments, social-networking system 1160 may include a variety of servers, sub-systems, programs, modules, logs, and data stores. In particular embodiments, social-networking system 1160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1160 may also include suitable components such as network interfaces, security mechanisms, load balancers, failover servers, management-and-network-operations consoles, other suitable components, or any suitable combination thereof. In particular embodiments, social-networking system 1160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1160 to one or more client systems 1130 or one or more third-party system 1170 via network 1110. The web server may include a mail server or other messaging functionality for receiving and routing messages between social-networking system 1160 and one or more client systems 1130. An API-request server may allow a third-party system 1170 to access information from social-networking system 1160 by calling one or more APIs. An action logger may be used to receive communications from a web server about a user's actions on or off social-networking system 1160. In conjunction with the action log, a third-party-content-object log may be maintained of user exposures to third-party-content objects. A notification controller may provide information regarding content objects to a client system 1130. Information may be pushed to a client system 1130 as notifications, or information may be pulled from client system 1130 responsive to a request received from client system 1130. Authorization servers may be used to enforce one or more privacy settings of the users of social-networking system 1160. A privacy setting of a user determines how particular information associated with a user can be shared. The authorization server may allow users to opt in to or opt out of having their actions logged by social-networking system 1160 or shared with other systems (e.g., third-party system 1170), such as, for example, by setting appropriate privacy settings. Third-party-contentobject stores may be used to store content objects received from third parties, such as a third-party system 1170. Location stores may be used for storing location information received from client systems 1130 associated with users. Advertisement-pricing modules may combine social information, the current time, location information, or other suitable information to provide relevant advertisements, in the form of notifications, to a user.

Social Graphs

Figure 12:
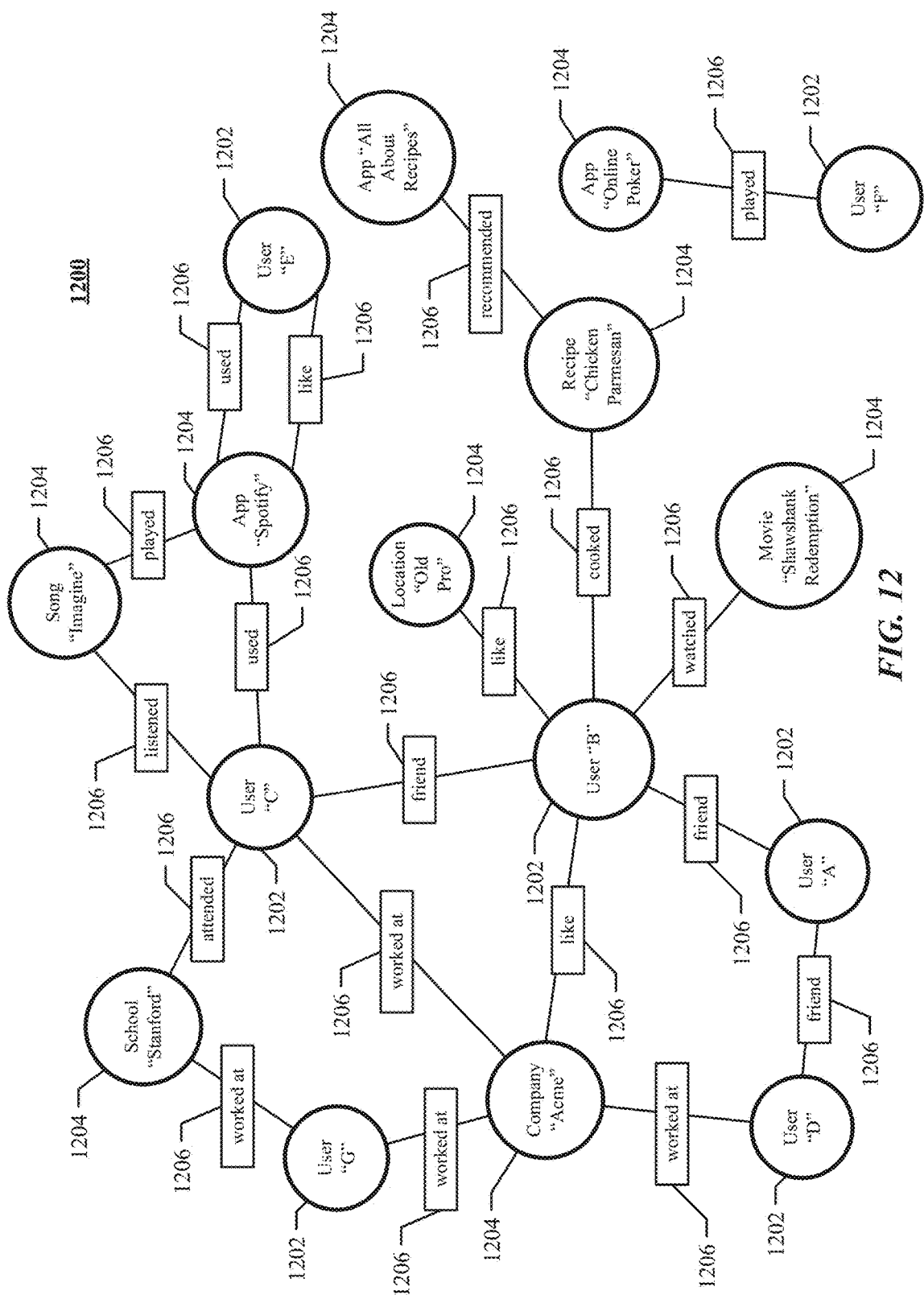
FIG. 12 illustrates an example social graph.

FIG. 12 illustrates example social graph 1200. In particular embodiments, social-networking system 1160 may store one or more social graphs 1200 in one or more data stores. In particular embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In particular embodiments, a social-networking system 1160, client system 1130, or third-party system 1170 may access social graph 1200 and related social-graph information for suitable applications. The nodes and edges of social graph 1200 may be stored as data objects, for example, in a data store (such as a social-graph database). Such a data store may include one or more searchable or queryable indexes of nodes or edges of social graph 1200.

In particular embodiments, a user node 1202 may correspond to a user of social-networking system 1160. As an example and not by way of limitation, a user may be an individual (human user), an entity (e.g., an enterprise, business, or third-party application), or a group (e.g., of individuals or entities) that interacts or communicates with or over social-networking system 1160. In particular embodiments, when a user registers for an account with social-networking system 1160, social-networking system 1160 may create a user node 1202 corresponding to the user, and store the user node 1202 in one or more data stores. Users and user nodes 1202 described herein may, where appropriate, refer to registered users and user nodes 1202 associated with registered users. In addition or as an alternative, users and user nodes 1202 described herein may, where appropriate, refer to users that have not registered with social-networking system 1160. In particular embodiments, a user node 1202 may be associated with information provided by a user or information gathered by various systems, including social-networking system 1160. As an example and not by way of limitation, a user may provide his or her name, profile picture, contact information, birth date, sex, marital status, family status, employment, education background, preferences, interests, or other demographic information. In particular embodiments, a user node 1202 may be associated with one or more data objects corresponding to information associated with a user. In particular embodiments, a user node 1202 may correspond to one or more webpages.

In particular embodiments, a concept node 1204 may correspond to a concept. As an example and not by way of limitation, a concept may correspond to a place (such as, for example, a movie theater, restaurant, landmark, or city); a website (such as, for example, a website associated with social-network system 1160 or a third-party website associated with a web-application server); an entity (such as, for example, a person, business, group, sports team, or celebrity); a resource (such as, for example, an audio file, video file, digital photo, text file, structured document, or application) which may be located within social-networking system 1160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1204 may be associated with information of a concept provided by a user or information gathered by various systems, including social-networking system 1160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1204 may be associated with one or more data objects corresponding to information associated with concept node 1204. In particular embodiments, a concept node 1204 may correspond to one or more webpages.

In particular embodiments, a node in social graph 1200 may represent or be represented by a webpage (which may be referred to as a "profile page"). Profile pages may be hosted by or accessible to social-networking system 1160. Profile pages may also be hosted on third-party websites associated with a third-party system 1170. As an example and not by way of limitation, a profile page corresponding to a particular external webpage may be the particular external webpage and the profile page may correspond to a particular concept node 1204. Profile pages may be viewable by all or a selected subset of other users. As an example and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In particular embodiments, a concept node 1204 may represent a third-party webpage or resource hosted by a third-party system 1170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 1130 to send to social-networking system 1160 a message indicating the user's action. In response to the message, social-networking system 1160 may create an edge (e.g., a check-in-type edge) between a user node 1202 corresponding to the user and a concept node 1204 corresponding to the third-party webpage or resource and store edge 1206 in one or more data stores.

In particular embodiments, a pair of nodes in social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. As an example and not by way of limitation, a first user may indicate that a second user is a "friend" of the first user. In response to this indication, social-networking system 1160 may send a "friend request" to the second user. If the second user confirms the "friend request," social-networking system 1160 may create an edge 1206 connecting the first user's user node 1202 to the second user's user node 1202 in social graph 1200 and store edge 1206 as social-graph information in one or more of data stores 1164. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example and not by way of limitation, an edge 1206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In particular embodiments, an edge 1206 between a user node 1202 and a concept node 1204 may represent a particular action or activity performed by a user associated with user node 1202 toward a concept associated with a concept node 1204. As an example and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, social-networking system 1160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 1160 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, social-networking system 1160 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "SPOTIFY").

In particular embodiments, social-networking system 1160 may create an edge 1206 between a user node 1202 and a concept node 1204 in social graph 1200. As an example and not by way of limitation, a user viewing a concept-profile page (such as, for example, by using a web browser or a special-purpose application hosted by the user's client system 1130) may indicate that he or she likes the concept represented by the concept node 1204 by clicking or selecting a "Like" icon, which may cause the user's client system 1130 to send to social-networking system 1160 a message indicating the user's liking of the concept associated with the concept-profile page. In response to the message, social-networking system 1160 may create an edge 1206 between user node 1202 associated with the user and concept node 1204, as illustrated by "like" edge 1206 between the user and concept node 1204. In particular embodiments, social-networking system 1160 may store an edge 1206 in one or more data stores. In particular embodiments, an edge 1206 may be automatically formed by social-networking system 1160 in response to a particular user action. As an example and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1204 corresponding to a particular photo may have a privacy setting specifying that the photo may only be accessed by users tagged in the photo and their friends. In particular embodiments, privacy settings may allow users to opt in or opt out of having their actions logged by social-networking system 1160 or shared with other systems (e.g., third-party system 1170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 1162 may be authorization/privacy servers for enforcing privacy settings. In response to a request from a user (or other entity) for a particular object stored in a data store 1164, social-networking system 1160 may send a request to the data store 1164 for the object. The request may identify the user associated with the request and may only be sent to the user (or a client system 1130 of the user) if the authorization server determines that the user is authorized to access the object based on the privacy settings associated with the object. If the requesting user is not authorized to access the object, the authorization server may prevent the requested object from being retrieved from the data store 1164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 13:
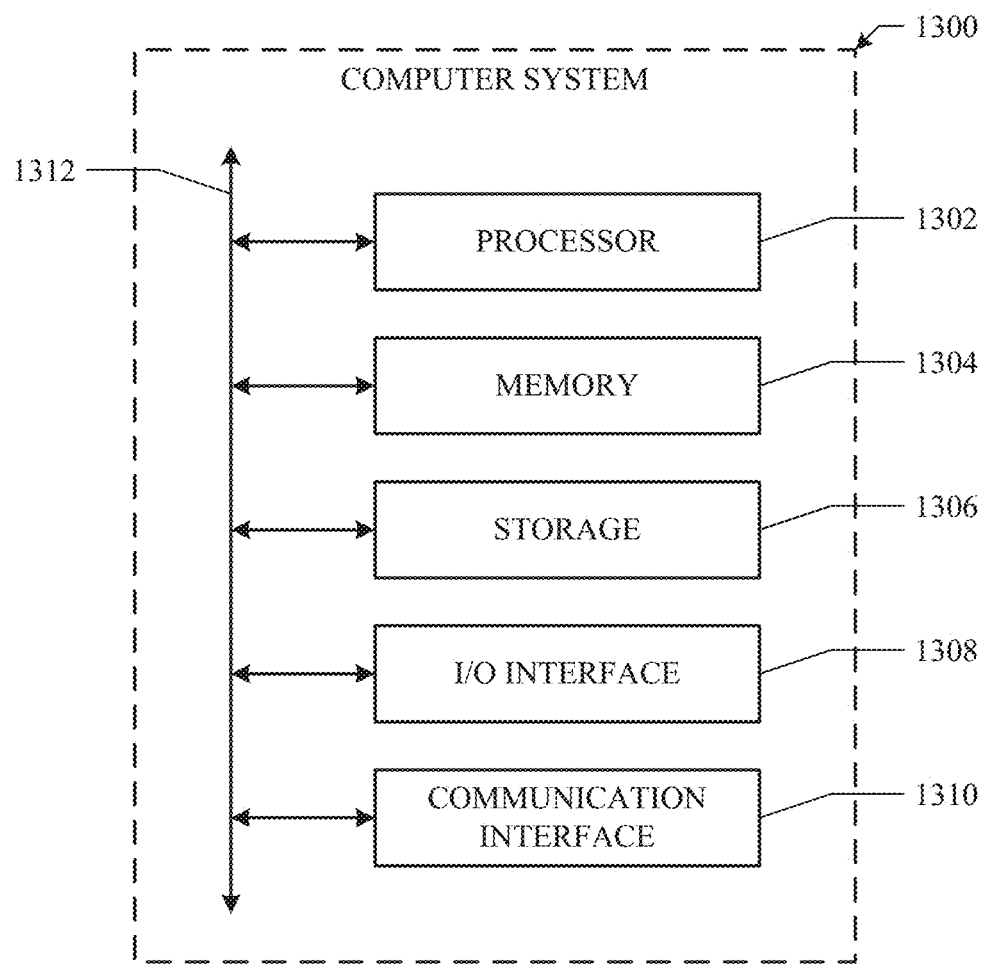
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor

1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computer systems of an online social network:
receiving, from a first software application of a first client system associated with a first user of the online social network, background signal-information identifying one or more first wireless signals within wireless communication range of the first client system, wherein the first software application is associated with the online social network, and wherein the online social network has permission to access the signal-information;
storing the signal-information and a first client identifier for the first client system in a signal-information database, wherein the first client identifier is hashed;
receiving, from a second software application of the first client system via a places-application programming interface (places-API) of the online social network, a places-API call indicating that the first client system is located at a geographic location corresponding to a first place-entity, wherein the second software application is separate from the first software application;
recording the places-API call in an API-call log, wherein the API-call log records the first place-entity and the first client identifier for the first client system, and wherein the first client identifier is hashed;
determining a correlation between the signal-information and the first place-entity by comparing the signal-information database and the API-call log to determine that the hash of the first client identifier in the signal-information database matches the hash of the first client identifier in the API-call log; and
updating a place-entity database to indicate that the first place-entity corresponds to the one or more first wireless signals identified by the signal-information.

2. The method of claim 1, wherein at least one of the wireless signals is a Wi-Fi signal, a Bluetooth signal, a cellular signal, a mobile phone signal, or a near-field communication signal.

3. The method of claim 1, wherein the signal-information comprises an identifier of one or more sources of the one or more wireless signals.

4. The method of claim 1, wherein the signal-information comprises a signal strength of the one or more wireless signals.

5. The method of claim 1 further comprising receiving, from the client system, first client identifier of the client system.

6. The method of claim 1, wherein the places-API comprises a set of instructions defined at the online social network, the set of instructions being executable to enable the second software application to request information about place-entities and send location information to the online social network.

7. The method of claim 1, further comprising:
receiving, from a second client system of a second user, background signal-information identifying one or more second wireless signals within wireless communication range of the second client system;
determining that the one or more second wireless signals match the one or more first wireless signals;
determining that the second client system is located at a geographic location associated with the first place-entity based on the indication in the place-entity database that the one or more first wireless signals correspond to the first place-entity; and
sending, to the second client system, information associated with the first place-entity.

8. The method of claim 7, wherein determining that the second client system is located at the geographic location associated with the first place-entity is further based on location data received from the second client system.

9. The method of claim 1, wherein the places-API call comprises a label associated with the first place-entity.

10. The method of claim 1, wherein the places-API call comprises a social action associated with the first place-entity.

11. One or more computer-readable non-transitory storage media embodying software that is operable when executed to:
- receive, from a first software application of a first client system associated with a first user of the online social network, background signal-information identifying one or more first wireless signals within wireless communication range of the first client system, wherein the first software application is associated with the online social network, and wherein the online social network has permission to access the signal-information;
- store the signal-information and a first client identifier for the first client system in a signal-information database, wherein the first client identifier is hashed;
- receive, from a second software application of the first client system via a places-application programming interface (places-API) of the online social network, a places-API call indicating that the first client system is located at a geographic location corresponding to a first place-entity, wherein the second software application is separate from the first software application;
- record the places-API call in an API-call log, wherein the API-call log records the first place-entity and the first client identifier for the first client system, and wherein the first client identifier is hashed;
- determine a correlation between the signal-information and the first place-entity by comparing the signal-information database and the API-call log to determine that the hash of the first client identifier in the signal-information database matches the hash of the first client identifier in the API-call log; and
- update a place-entity database to indicate that the first place-entity corresponds to the one or more first wireless signals identified by the signal-information.

12. The media of claim 11, wherein at least one of the wireless signals is a Wi-Fi signal, a Bluetooth signal, a cellular signal, a mobile phone signal, or a near-field communication signal.

13. The media of claim 11, wherein the signal-information comprises an identifier of one or more sources of the one or more wireless signals.

14. The media of claim 11, wherein the signal-information comprises a signal strength of the one or more wireless signals.

15. The media of claim 11, wherein the software is further operable when executed to receive, from the client system, first client identifier of the client system.

16. The media of claim 11, wherein the places-API comprises a set of instructions defined at the online social network, the set of instructions being executable to enable the second software application to request information about place-entities and send location information to the online social network.

17. The media of claim 11, wherein the software is further operable when executed to:
- receive, from a second client system of a second user, background signal-information identifying one or more second wireless signals within wireless communication range of the second client system;
- determine that the one or more second wireless signals match the one or more first wireless signals;
- determine that the second client system is located at a geographic location associated with the first place-entity based on the indication in the place-entity database that the one or more first wireless signals correspond to the first place-entity; and
- send, to the second client system, information associated with the first place-entity.

18. The media of claim 17, wherein determining that the second client system is located at the geographic location associated with the first place-entity is further based on location data received from the second client system.

19. The media of claim 11, wherein the places-API call comprises a label associated with the first place-entity.

20. A system comprising: one or more processors; and a non-transitory memory coupled to the processors comprising instructions executable by the processors, the processors operable when executing the instructions to:
- receive, from a first software application of a first client system associated with a first user of the online social network, background signal-information identifying one or more first wireless signals within wireless communication range of the first client system, wherein the first software application is associated with the online social network, and wherein the online social network has permission to access the signal-information;
- store the signal-information and a first client identifier for the first client system in a signal-information database, wherein the first client identifier is hashed;
- receive, from a second software application of the first client system via a places-application programming interface (places-API) of the online social network, a places-API call indicating that the first client system is located at a geographic location corresponding to a first place-entity, wherein the second software application is separate from the first software application;
- record the places-API call in an API-call log, wherein the API-call log records the first place-entity and the first client identifier for the first client system, and wherein the first client identifier is hashed;
- determine a correlation between the signal-information and the first place-entity by comparing the signal-information database and the API-call log to determine that the hash of the first client identifier in the signal-information database matches the hash of the first client identifier in the API-call log; and
- update a place-entity database to indicate that the first place-entity corresponds to the one or more first wireless signals identified by the signal-information.

* * * * *